United States Patent
Mizner (12)

(10) Patent No.: US 8,974,169 B2
(45) Date of Patent: *Mar. 10, 2015

(54) FORK LIFT ATTACHMENT TOOLS AND METHODS

(76) Inventor: Richard J. Mizner, Surprise, AZ (US)

( * ) Notice: Subject to any disclaimer, the term of this patent is extended or adjusted under 35 U.S.C. 154(b) by 2530 days.

This patent is subject to a terminal disclaimer.

(21) Appl. No.: 11/207,137

(22) Filed: Aug. 17, 2005

(65) Prior Publication Data

US 2006/0263182 A1  Nov. 23, 2006

Related U.S. Application Data

(63) Continuation-in-part of application No. 10/958,520, filed on Oct. 4, 2004, now Pat. No. 8,322,968.

(60) Provisional application No. 60/553,610, filed on Mar. 15, 2004.

(51) Int. Cl.
| | |
|---|---|
| *B60P 1/54* | (2006.01) |
| *B60P 1/44* | (2006.01) |
| *B66F 9/08* | (2006.01) |
| *E02F 3/96* | (2006.01) |

(52) U.S. Cl.
CPC ............. *B60P 1/4421* (2013.01); *B60P 1/5428* (2013.01); *B66F 9/082* (2013.01); *E02F 3/96* (2013.01)
USPC ........... 414/462; 414/24.5; 414/607; 414/635

(58) Field of Classification Search
CPC ....... B60P 1/5428; B60P 1/5476; B66F 9/082
USPC ......................................... 414/642, 24.5, 635
See application file for complete search history.

(56) References Cited

U.S. PATENT DOCUMENTS

| | | | |
|---|---|---|---|
| 2,267,209 A | 12/1941 | Morando | |
| 2,653,678 A | 9/1953 | Lehrman | |
| 2,709,269 A * | 5/1955 | Williams | ........................ 15/52.1 |
| 2,993,607 A * | 7/1961 | Tapper | ........................... 414/541 |
| 3,033,394 A * | 5/1962 | Kashergen | ..................... 172/247 |
| 3,235,105 A | 2/1966 | Loomis | |
| 3,357,580 A | 12/1967 | Schettler et al. | |
| 3,412,882 A | 11/1968 | Stockwell | |
| 3,521,780 A | 7/1970 | Cook | |
| 3,597,908 A * | 8/1971 | Schaefer et al. | ................. 56/233 |
| 3,669,292 A | 6/1972 | Tuura | |
| 3,896,956 A | 7/1975 | Hostetler | |

(Continued)

FOREIGN PATENT DOCUMENTS

FR  2615157 A1  11/1988

*Primary Examiner* — James Keenan
(74) *Attorney, Agent, or Firm* — Greg L. Martinez

(57) ABSTRACT

A fork lift, and especially a fork lift for a truck, may have structure on a forklift carriage for selectively receiving any of a variety of attachment tools. Alternatively, an assembly may be secured to the carriage and the assembly may provide the structure for selectively receiving the attachment tools. The structure may include a bolt and lever mechanism for selectively securing and releasing the attachment tools. A method may include selectively securing any of a variety of attachment tools including, but not limited to, a trencher, an auger, a backhoe, and a hydraulic breaker. These attachment tools may be connected to a hydraulic system for control of the attachment tools. The method may include the preliminary steps of locking the forklift against movement along a mast and insertion of fork tips in pocket(s) supported in the truck.

47 Claims, 13 Drawing Sheets

(56) References Cited

U.S. PATENT DOCUMENTS

| | | | | |
|---|---|---|---|---|
| 4,023,690 A | | 5/1977 | Goode | |
| 4,090,616 A | | 5/1978 | Runyan et al. | |
| 4,128,179 A | * | 12/1978 | Gilbert | 414/24.5 |
| 4,177,001 A | * | 12/1979 | Blackwood | 414/628 |
| 4,179,034 A | | 12/1979 | Van Antwerp et al. | |
| 4,206,829 A | | 6/1980 | Melocik | |
| 4,279,328 A | | 7/1981 | Ahlbom | |
| 4,325,666 A | * | 4/1982 | Chain et al. | 414/24.5 |
| 4,365,921 A | * | 12/1982 | Brouwer et al. | 414/347 |
| 4,383,792 A | | 5/1983 | Seabloom et al. | |
| 4,415,302 A | * | 11/1983 | Brouwer et al. | 414/416.04 |
| 4,463,858 A | * | 8/1984 | Bilas | 212/176 |
| 4,666,360 A | * | 5/1987 | Harms et al. | 414/607 |
| 4,778,327 A | | 10/1988 | Tufenkian et al. | |
| 4,943,203 A | * | 7/1990 | Bohata | 414/486 |
| 4,948,326 A | | 8/1990 | Bedard | |
| 5,088,636 A | * | 2/1992 | Barajas | 224/281 |
| 5,208,753 A | | 5/1993 | Acuff | |
| 5,326,217 A | | 7/1994 | Simpson et al. | |
| 5,391,043 A | | 2/1995 | Bohata et al. | |
| 5,409,346 A | | 4/1995 | Grether | |
| 5,495,987 A | * | 3/1996 | Slaby | 241/27 |
| 5,542,803 A | | 8/1996 | Driggs | |
| 5,653,569 A | | 8/1997 | Sears | |
| 5,816,764 A | | 10/1998 | Bohata | |
| 5,951,236 A | | 9/1999 | Thompson | |
| 5,975,826 A | * | 11/1999 | Scholder | 414/444 |
| 6,019,567 A | | 2/2000 | Lutkus et al. | |
| 6,033,177 A | | 3/2000 | Kooima | |
| 6,116,843 A | | 9/2000 | Braud | |
| 6,234,741 B1 | * | 5/2001 | McDaniel | 414/546 |
| 6,460,744 B2 | * | 10/2002 | Lance et al. | 224/404 |
| 6,655,897 B1 | | 12/2003 | Harwell | |
| 6,921,240 B2 | * | 7/2005 | Moore | 414/607 |
| 6,932,555 B2 | * | 8/2005 | Dale et al. | 414/607 |
| 6,957,847 B2 | | 10/2005 | Rigel | |
| 7,033,128 B2 | * | 4/2006 | Poindexter | 414/544 |
| 2001/0022616 A1 | | 9/2001 | Rademacher et al. | |
| 2004/0208735 A1 | * | 10/2004 | DePue | 414/607 |
| 2005/0129494 A1 | * | 6/2005 | Chandler et al. | 414/607 |
| 2006/0133914 A1 | | 6/2006 | Derks | |
| 2007/0166138 A1 | | 7/2007 | Brooks | |

* cited by examiner

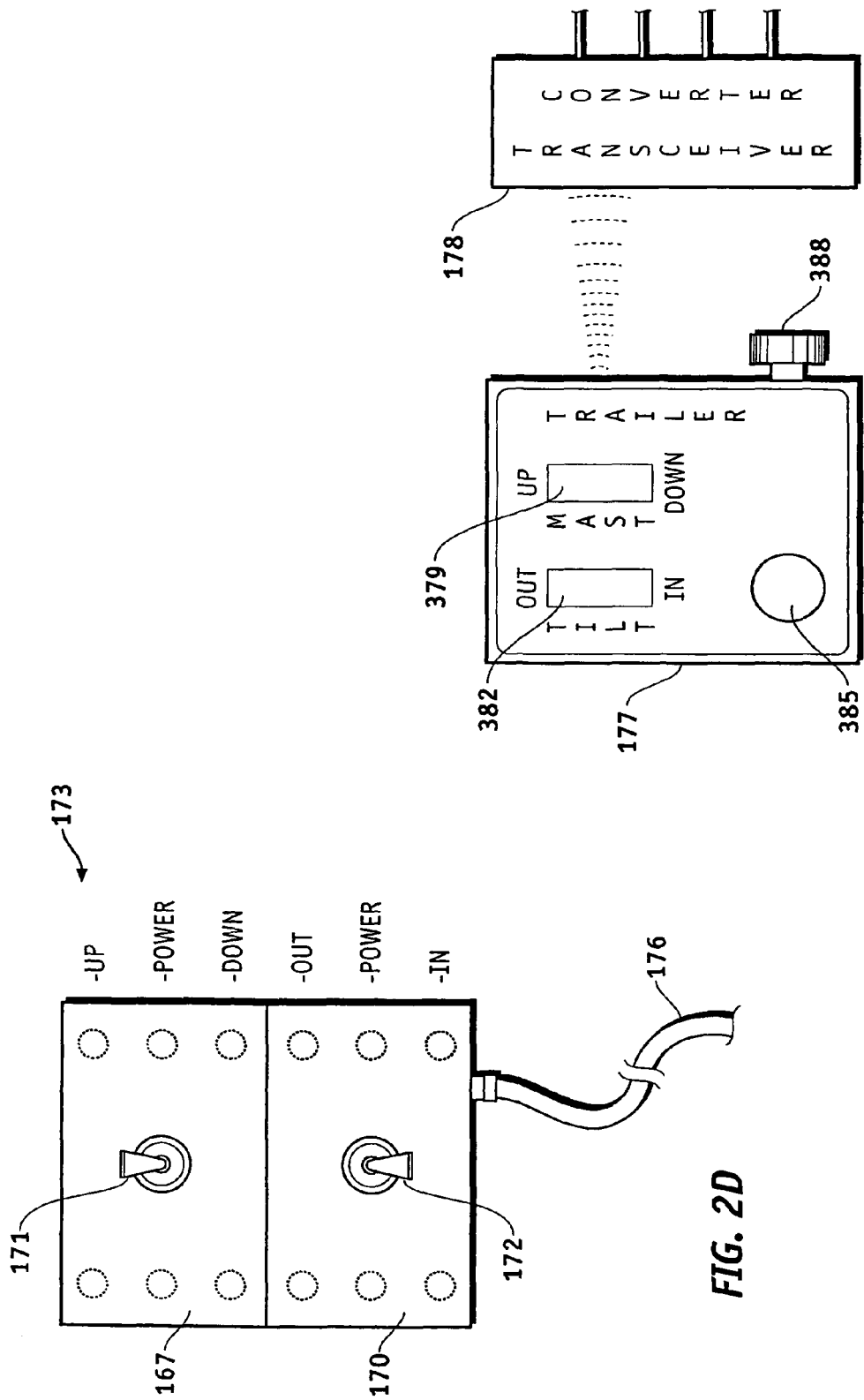

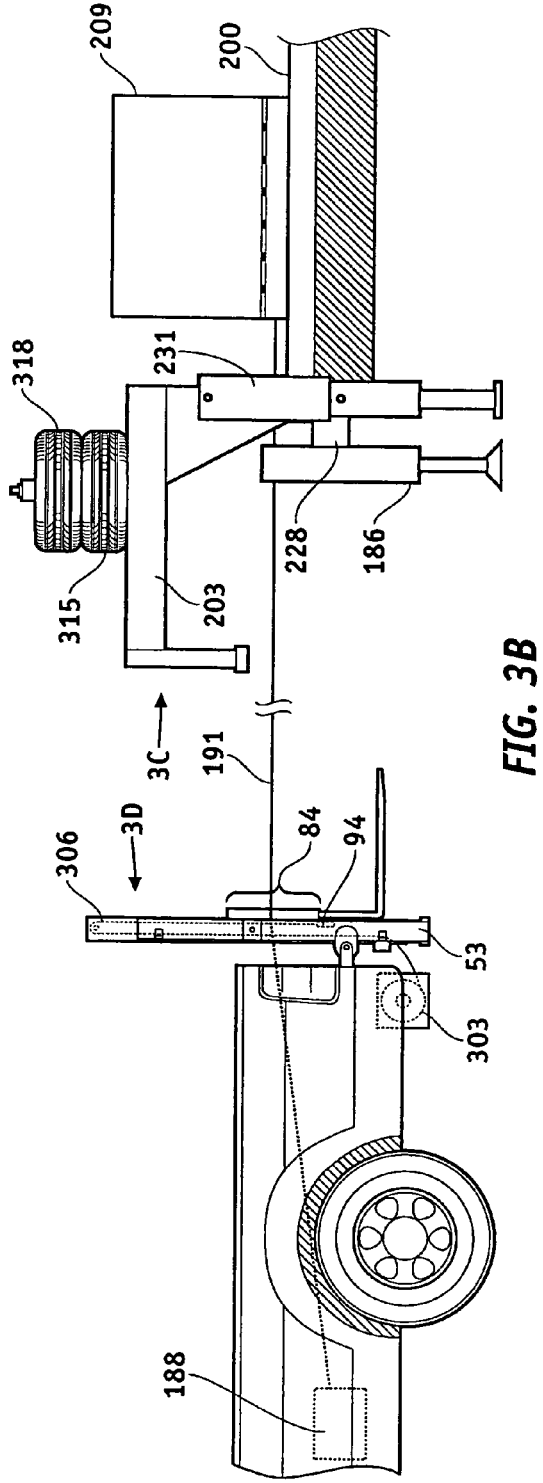
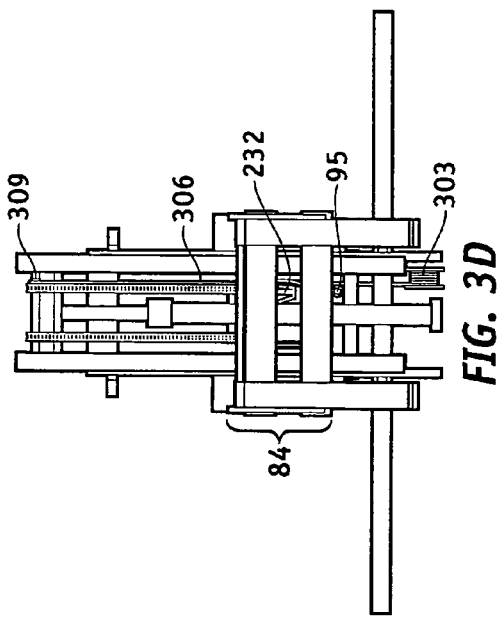
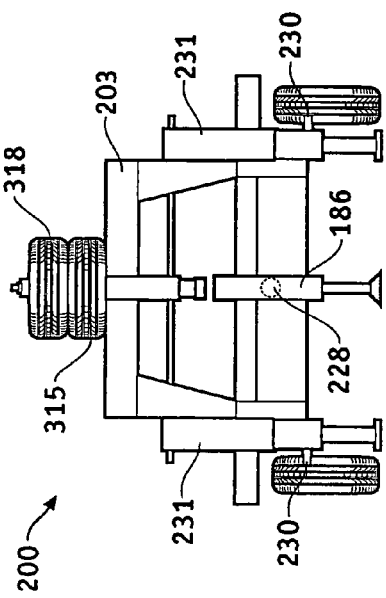
FIG. 3B
FIG. 3D
FIG. 3C

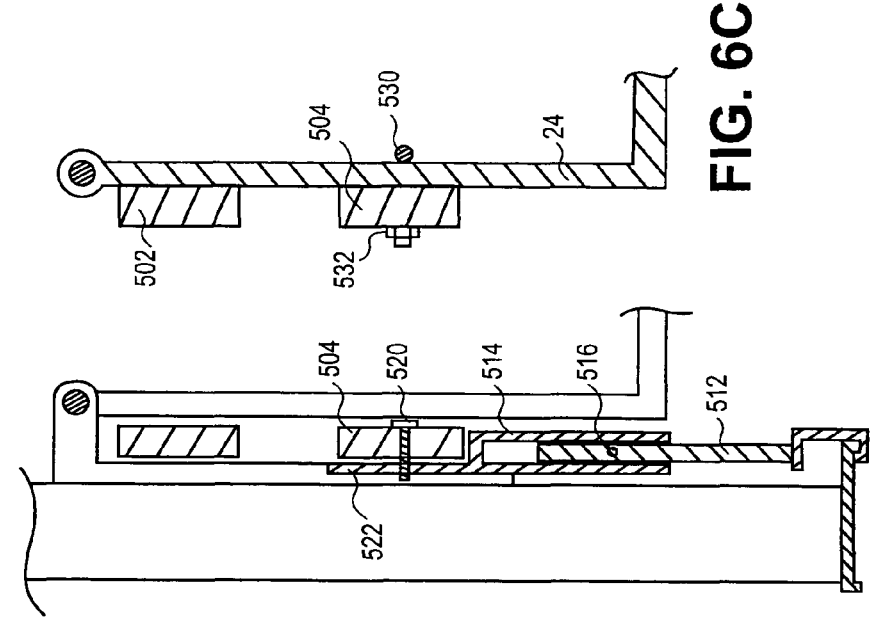
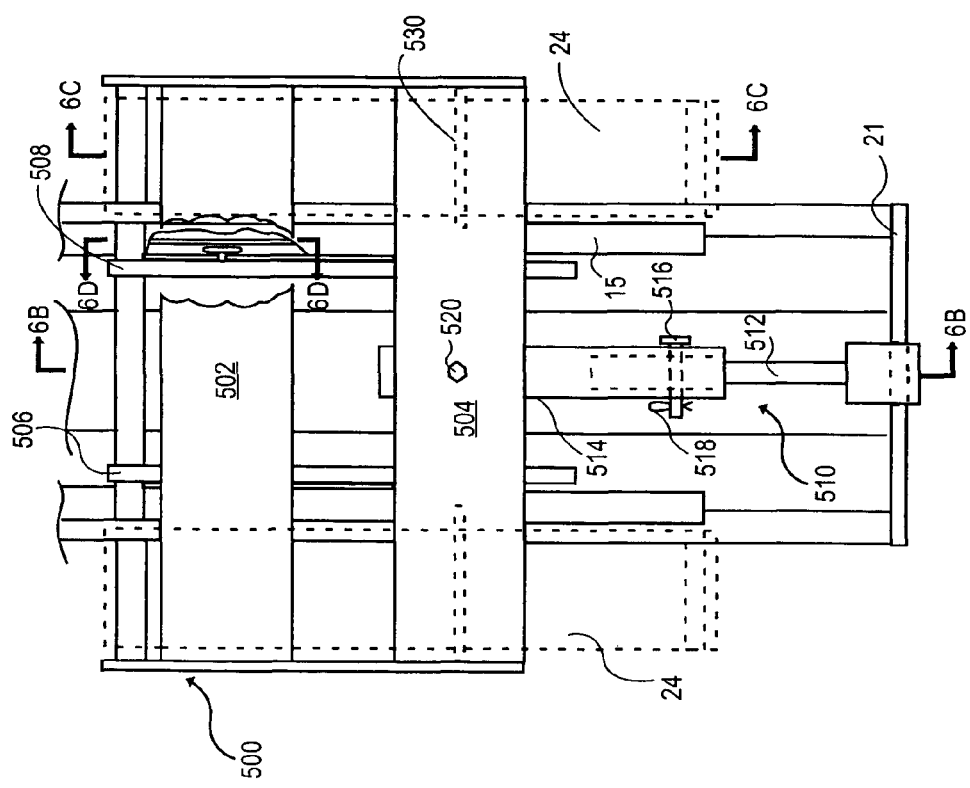
FIG. 6C
FIG. 6B
FIG. 6A

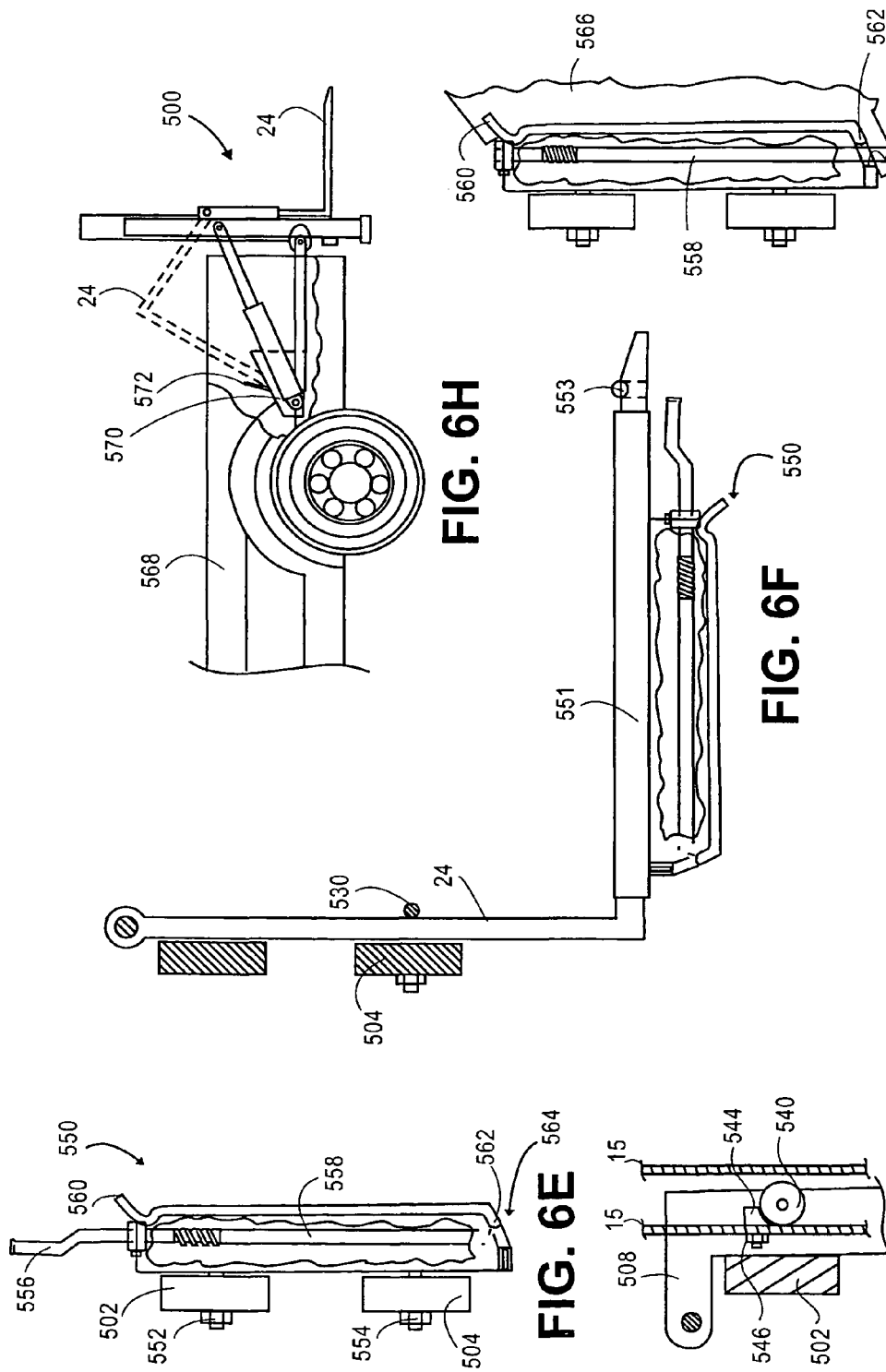

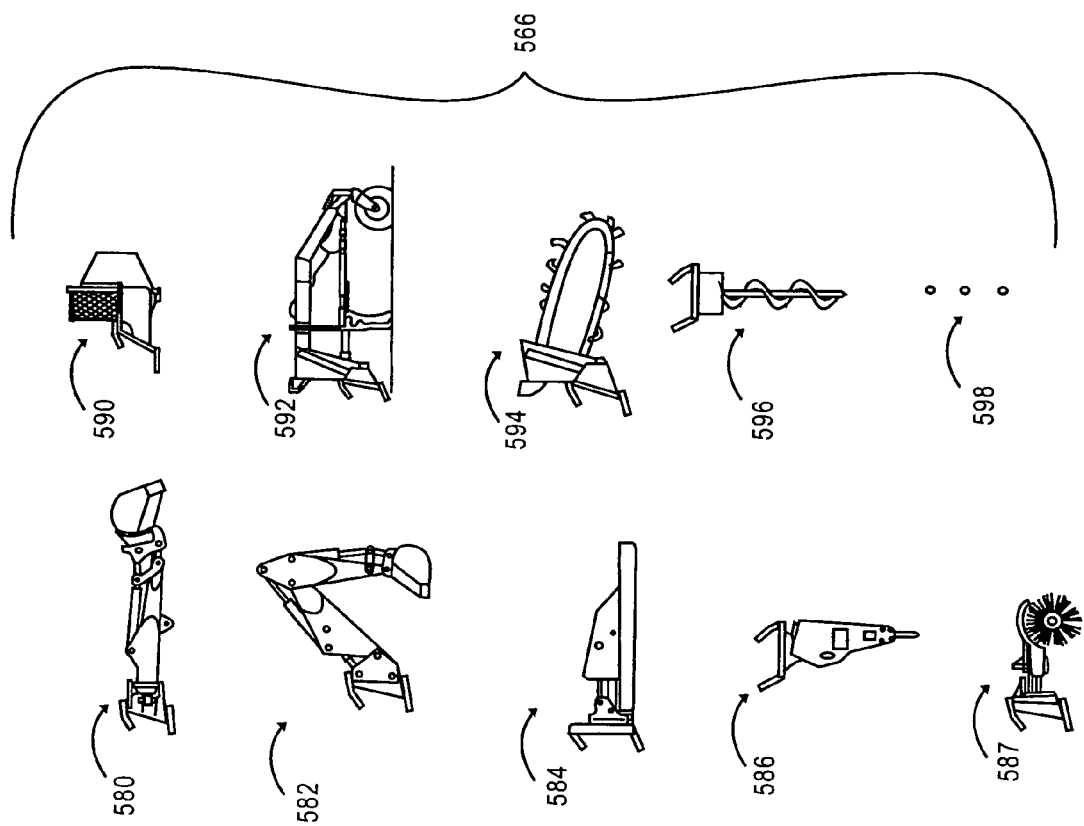

FORK LIFT ATTACHMENT TOOLS AND METHODS

This application is a continuation-in-part of U.S. patent application Ser. No. 10/958,520, entitled "FORK LIFT FOR TRUCKS, METHODS, AND ASSOCIATED DEVICES", which was filed by the same inventor on Oct. 4, 2004 now U.S. Pat. No. 8,322,968, the contents of which are incorporated by reference as though fully set forth herein. U.S. patent application Ser. No. 10/958,520 claims the benefit of U.S. Provisional Application No. 60/553,610, entitled "TRUCK FORK LIFT, METHODS, AND ASSOCIATED DEVICES", which was filed by the same inventor on Mar. 15, 2004, the contents of which are incorporated by reference as though fully set forth herein.

BACKGROUND OF THE INVENTION

1. Technical Field

The present invention relates to a vehicle which includes a fork lift for lifting a load.

2. State of the Art

In the past, lifts on trucks have included booms or cranes. These booms are generally tall and are not well adapted for placing pallets in residential garages. Furthermore, these lifts are manufactured with a limited capacity, which is typically less than or equal to 1,500 pounds. The tendency is to overload the boom and risk failure, damage to property, and possible injury to the operator or others. Users of such lifts are typically not experienced in loading, transporting, and unloading heavily laden pallets. However, with the advent of Home Depot (TM of Homer TLC, Inc.) and other do-it-yourself home product and project stores, the temptation for users to try to handle loads with such lifts is very real. In operating such a lift, maintaining control of the swinging load can be especially dangerous. Hence, devices and a method for home delivery of loads in a range from approximately 200 pounds up to approximately 4000 pounds are needed. It should be noted that currently the state of Arizona, (and perhaps other states), require a CDL license for loads of 2,601 pounds or greater. Additional fees are also required for carrying such loads.

In other applications, such as in roofing of new buildings having high roofs and/or uneven or soft terrain, a telescoping all-terrain fork lift is used. These all-terrain fork lifts are expensive and costly to maintain. For example, changing the brakes on a fork lift can cost around $2,000. Furthermore, some fork lifts do not have the capability of moving on rough or soft terrain.

Additionally, for other various applications and tasks, such as digging, cutting and mulching, demolition work and other tasks, a separate machine or device is used. Purchasing or renting other equipment results in additional equipment costs.

DISCLOSURE OF THE INVENTION

The present invention provides a vehicle which includes a fork lift for lifting a load. The novel features of the invention are set forth with particularity in the appended claims. The invention will be best understood from the following description when read in conjunction with the accompanying drawings.

BRIEF DESCRIPTION OF THE DRAWINGS

FIG. 2D is a top plan view of a control box of the hydraulic actuation system of FIG. 1B.

FIG. 2E is a top view of a control box and transceiver of the hydraulic actuation system of FIG. 1B.

FIG. 3B is a side view of the truck and fork lift of FIGS. 1A and 1B and a portion of the trailer of FIG. 3A.

FIG. 3C is a front plan view of the trailer of FIG. 3B.

FIG. 3D is a rear plan view of the fork lift of FIG. 3B.

FIG. 6A is a front plan view of a fork lift with a fork lift carriage in a locked position.

FIG. 6B is a section view of the fork lift of FIG. 6A taken along line 6B-6B further showing the fork lift carriage held in the locked position by a tension element.

FIG. 6C is a section view of the fork lift of FIG. 6A taken along line 6C-6C with a fork locked to the fork lift carriage.

FIG. 6D is a section view of the carriage taken along line 6MD of FIG. 6A with the fork lift carriage in a locked position by use of a stop to resist movement of a roller of the carriage.

FIG. 6E is a partially cut away side view of a carriage attachment assembly coupled to the fork lift carriage.

FIG. 6F is a partially cut away side view of the carriage attachment assembly coupled to forks of a fork lift.

FIG. 6G is a partially cut away side view of the carriage attachment assembly coupled to a fork lift carriage and an attachment tool.

FIG. 6H is a side view of a fork lift with rotatable forks in a truck.

FIG. 7 is a side view of a plurality of attachment tools that may be used with a carriage attachment assembly.

DETAILED DESCRIPTION OF EMBODIMENTS OF THE INVENTION

Figure 1A:
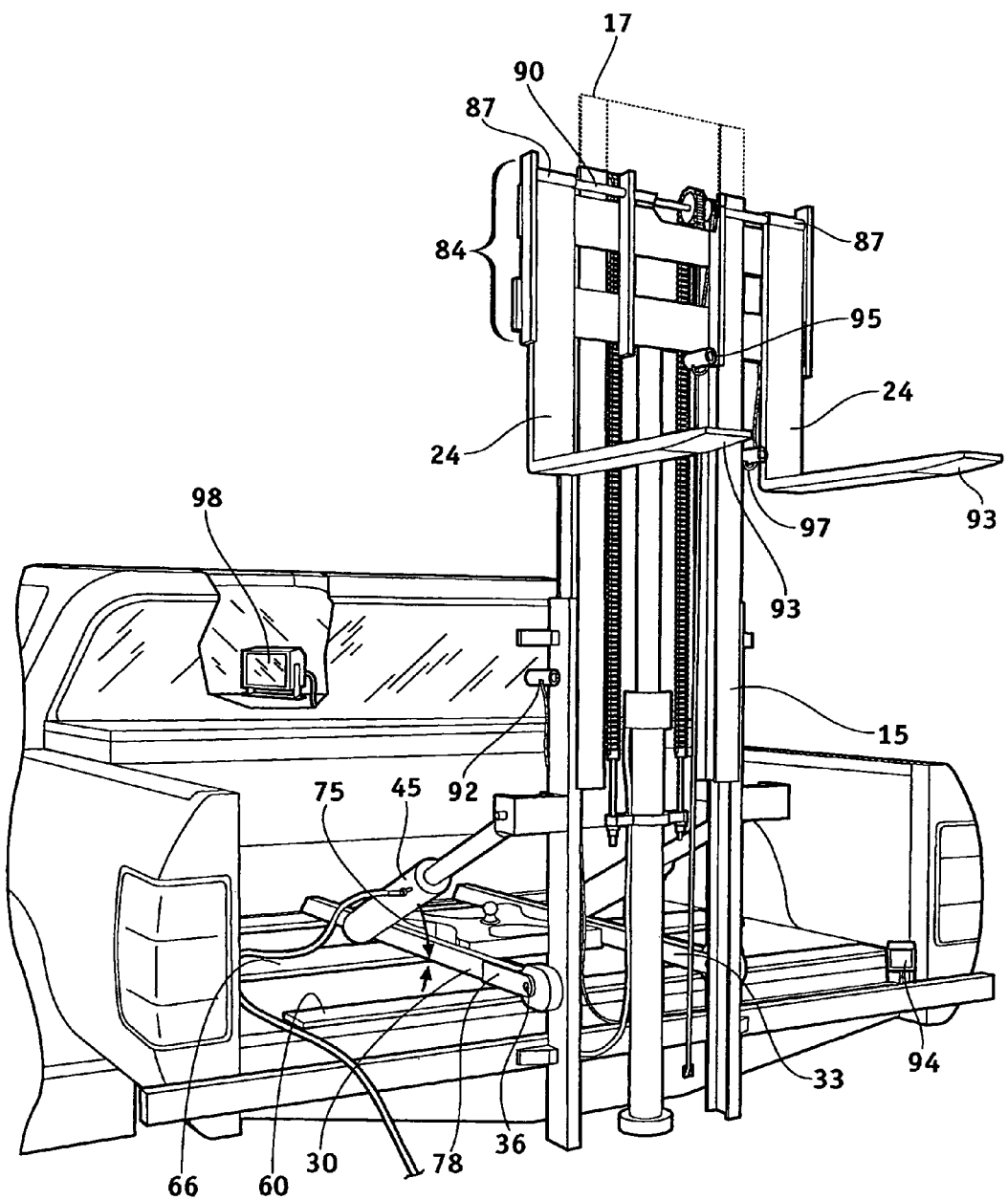
FIG. 1A is a rear perspective view of a pickup truck and fork lift combination vehicle.

FIG. 1A is a rear perspective view of a pickup truck and fork lift combination vehicle 12, which facilitates the easier, faster, and safer loading and transport of medium sized loads. Medium sized loads for the purposes of the present invention are defined as loads having a weight in a range from approximately 200 pounds to approximately 3,000 pounds. In this embodiment, vehicle 12 includes a pickup truck 18 and fork lift 15. The fork lift 15 is a fork lift having a capacity rating to approximately 7,000 pounds. The fork lift 15 is an extensible fork lift, as indicated by the break line and dashed extension at 17 in FIG. 1A. Likewise, the pickup truck 18 is a truck having a manufacturer's rating of 3,400 to 7,000 pounds. Alternatively, the pickup truck may be modified to include a suspension with a 5,000 pound rating or a 7,000 pound rating, for example. Larger trucks and fork lifts having higher capacity ratings can also be implemented in accordance with the present invention. Nevertheless, loads weighing in the range to approximately 7,000 pounds may be lifted by the lifts of the present invention.

Figure 1B:
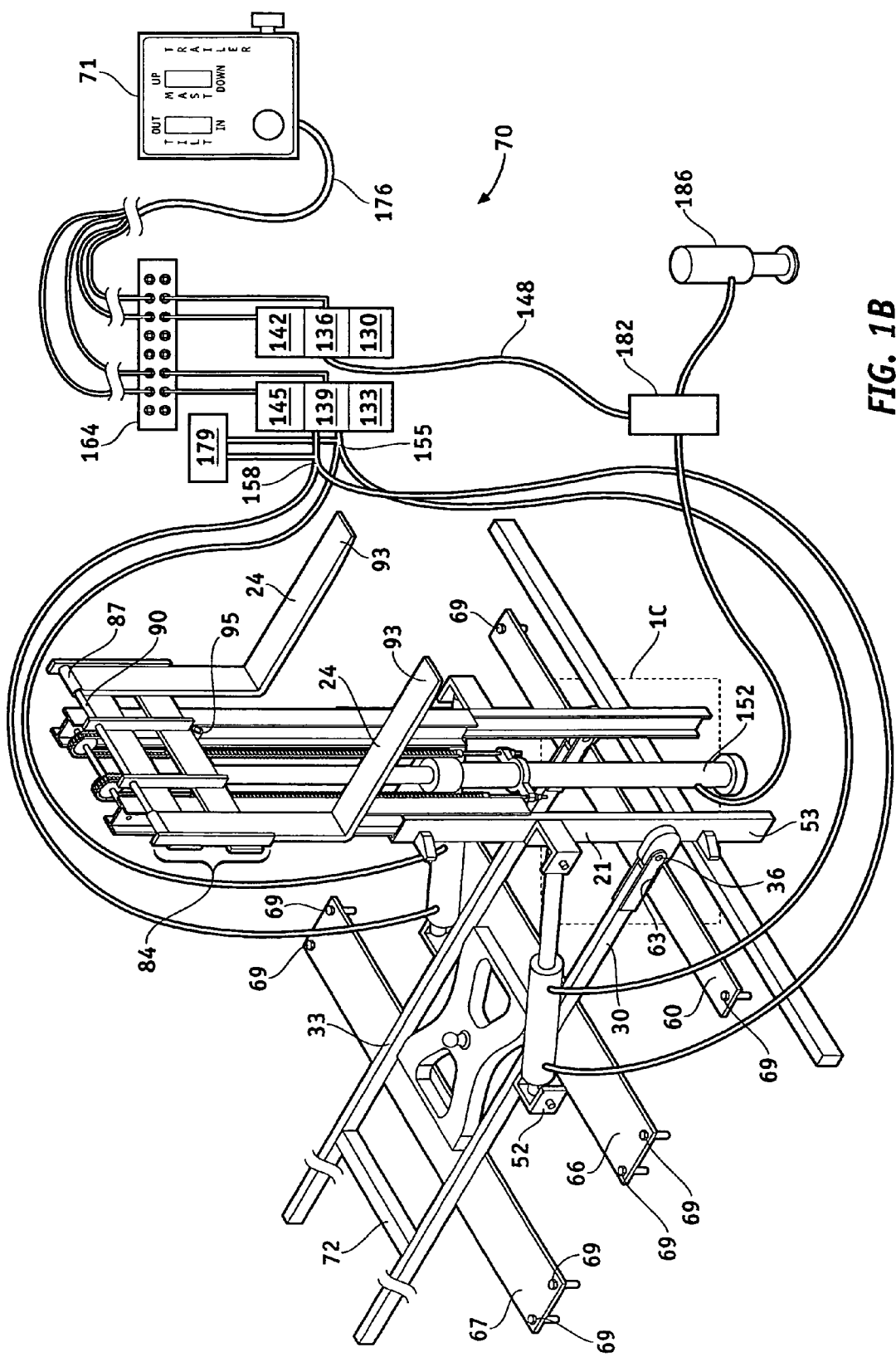
FIG. 1B is a perspective view of the fork lift of FIG. 1A, and a hydraulic actuation system.

FIG. 1B is a perspective view of the fork lift 15 of FIG. 1A, and a hydraulic actuation system 70. The fork lift 15 includes fork lift masts 21 and 22 and forks 24. The masts 21 and 22 are pivotally supported on a truck bed 27 by a pair of fore and aft extending channel beams 30 and 33, respectively. These beams 30, 33 are mounted to the truck frame or chassis 336 (FIG. 5A) by bolts or other mounting structure that passes through the bed 27 of the truck 18. Alternatively, the beams 30, 33 may form part of the chassis. This may be accomplished by modifying the truck frame to include the beams 30, 33, or the beams 30, 33 may be incorporated as part of the chassis during the original manufacture of the vehicle. Pivot connections 36 and 37 (FIG. 1C), which are at the rear end of the bed 27, and beams 30, 33 enable masts 21 and 22, respectively, to rotate from the vertical position of use shown in FIG. 1A into a stored and transport position laying more or less flat in the bed 27. Hydraulic rams 45 and 46 are connected to the beams 30 and 33, respectively, and to corresponding masts 21 and 22 for selectively moving the fork lift 15 from a vertically oriented position of use to a stowed position of transport with the mast lying generally flat or in an overlying relation in the bed 27 of the truck.

Other arrangements can alternatively be implemented for raising and lowering the fork lift masts 21 and 22 relative to the beams 30, 33 and the bed 27 of the truck. One such arrangement involves the hydraulic ram 45 connected to a linkage that extends between and is connected to each of the mast 21, and the beams 30, 33. In this linkage version, the linkage arms may be moved from a doubled condition into a relatively straight condition as the fork lift mast 21 is moved from a stowed position into a vertical position of use. In any case, one or more tilt rams 45 may be incorporated, and the hydraulic rams 45 and 46 can also provide tilting adjustment of the mast 21 during use such as for positioning the forks in order to lean a load toward the mast during transport. The tilt ram(s) 45 may be mounted to a block or mounting plate 52 connected to the beams 30, 33 or to the truck frame generally at or below the level of the truck bed 27, as shown in FIG. 1B. Furthermore, the pivot connection 36 of the mast may be close to the level of the bed 27 so that the mast may be pulled and pushed in and out of an overlying relationship relative to the truck bed 27 and beams 30, 33.

Further alternatively, one or more hydraulic rams 45 may be positioned under the bed 27 of the truck and connected to a lower end 53 of the mast 21. While this configuration has the advantage of enabling a lower profile stowed position of the mast 21 in the truck bed 27, locating the hydraulic rams 45 under the bed 27 and connecting them to the frame of the truck may occupy a space that otherwise would be used for storage of a spare tire.

In one exemplary embodiment, a suspension of the truck 18 may have six main springs and five overload springs at each of the rear wheels. The springs may be adjusted so that the lowest overload spring is in a range from approximately one half to three fourths of an inch above the lowest main spring. In this configuration, the truck will only squat slightly before engaging the overload springs. For example, the truck 18 having this spring configuration and having the truck fork lift 15 and associated components on the truck 18 without any additional load may squat just enough to engage or almost engage the overload springs. This may be important in order to ensure that the truck maintains a proper clearance for a lower end 53 of the fork lift mast. As may be appreciated from FIG. 1A, the lower end 53 of the mast may have a clearance of approximately twelve to fourteen inches in a non-loaded state. When fully loaded, the rear suspension of the truck will engage the overload springs and may only squat approximately four inches, leaving a minimum of approximately eight inches of clearance from the ground. This amount of clearance is excellent when compared to a regular clearance in a range from approximately three to four inches between a lower end of a mast and the ground for a standard fork lift. Standard fork lifts are configured to have the forks extend downwardly a maximum of approximately two to four inches from the lower end of the mast. The capability of extending the forks downwardly from the lower end of the mast enables the forks to engage or nearly engage the ground so that they may slide under low set loads, such as when stabbing the forks into and engaging a pallet. With the mast 21 of the present invention, the forks must be extended downwardly by approximately fifteen inches more than standard forks in order to compensate for the clearance between the lower end 53 of the mast 21 and the ground. With this clearance and these modifications, the truck and fork lift 12 is well adapted for any terrain having medium to great contours. For example, the truck and fork lift 12, having a fourteen inch non-loaded clearance for the lower end 53, may back a load of three thousand to three thousand eight hundred pounds down a twenty degree slope into a garage having a level floor and maintain a clearance of nine inches or more.

Hence, fork lift 15 is for attachment to a truck frame 336 (FIG. 5A) of a truck 18. In one embodiment, the fork lift 15 includes a fork lift mast assembly 16 pivotably coupled to first and second mounting beams 30 and 33 through tilt actuators 45 and 46, respectively. The first and second tilt actuators 45 and 46 are connected between the first and second mounting beams 30 and 33, respectively, and the fork lift mast assembly 16. The first and second tilt actuators 45 and 46 are connected to the fork lift mast assembly 16 through fork lift mast brackets 57 and 58, respectively. The fork lift mast assembly 16 is repeatably moveable between positions extending parallel and perpendicular to the truck bed 27 in response to actuating actuators 45 and 46.

Figure 5A:
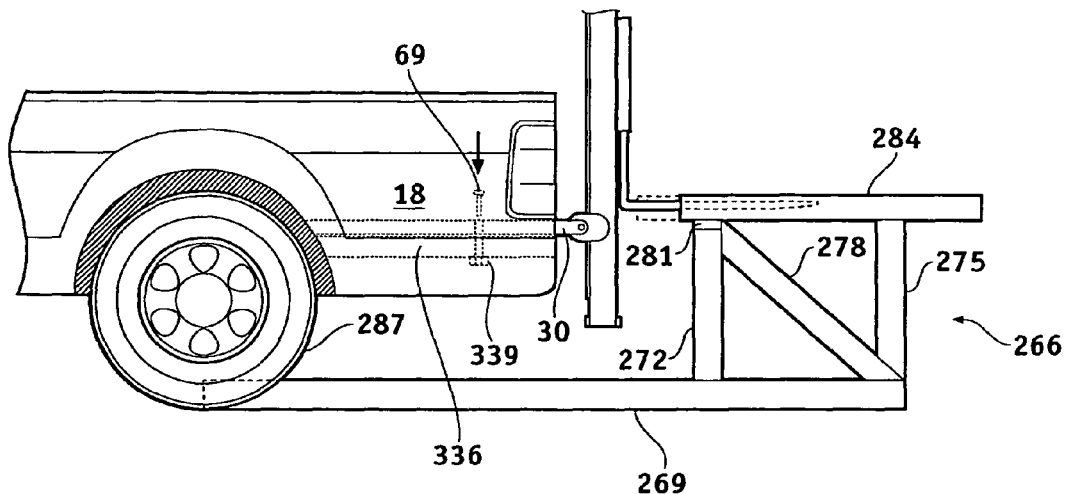
FIG. 5A is a side view of a fork lift stanchion for supporting the fork lift of FIGS. 1A and 1B in a condition separate from the truck.

In this embodiment, the first and second mounting beams 30 and 33 are carried by the truck frame 336. A truck bed 27 is positioned between the truck frame 336 and the first and second mounting beams 30 and 33. In this way, the first and second mounting beams 30 and 33 are positioned above the truck bed 27 of the truck 18. In this embodiment, the distal ends of the first and second mounting beams 30 and 33 extend beyond the rear of the truck bed 27 (FIG. 5A). The fork lift mast assembly 16 is pivotally connected to the first and second mounting beam 30 and 33 proximate to the rear of the truck bed 27.

In this embodiment, the fork lift 15 includes a plurality of detachable attachment mechanisms 69 connecting the first and second mounting beams 30 and 33 to the truck frame 336. The plurality of detachable attachment mechanisms 69 extend through the truck bed 27 of the truck 18. The truck bed 27 includes an opening through which the detachable attachment mechanism 69 extends. In some embodiments, the detachable attachment mechanisms 69 extend through openings of the truck bed 27. As shown in FIG. 5A, detachable attachment mechanism 69 is positioned between a rear of the truck bed 27 and a rear wheel 287 of the truck. In this way, at least one of the detachable attachment mechanisms 69 is positioned between a rear of the truck bed 27 and a rear wheel 287 of the truck 18. In this embodiment, detachable attachment mechanism 69 extends through the truck bed 27, and has one end engaged with the truck frame 336 and an opposed end engaged with the mounting beam 30 (FIG. 5A). It should be noted that, in this embodiment, another attachment mechanism 69 has an end connected to the truck frame 336 and an opposed end connected to the second mounting beam 33. In some embodiments, the first and second detachable attachment mechanisms 69 extend perpendicular to the first and second mounting beams 30 and 33, respectively. In this embodiment, the first and second detachable attachment mechanisms 69 connect the first and second mounting beams 30 and 33, respectively, to the truck frame 336. In this embodiment, the first and second attachment mechanisms 69 are engaged with the truck frame 336 and first and second mounting beams 30 and 33, respectively.

In this embodiment, the fork lift 15 includes a fork lift carriage 19 carried by the fork lift mast assembly 16. The fork lift carriage 19 is repeatably slideable between raised and lowered positions relative to the fork lift mast assembly 16. The fork lift mast assembly 16 includes a fork lift hydraulic ram 152. The fork lift carriage 19 is repeatably slideable between raised and lowered positions relative to the fork lift mast assembly 16 in response to actuating the fork lift hydraulic ram. In this way, the fork lift carriage 19 slides along the fork lift mast assembly 16 in response to actuating the fork lift hydraulic ram 152.

In this embodiment, the fork lift 15 includes first and second mast chains 250 and 251 which are coupled to the fork lift carriage 19. The first and second mast chains 250 and 251 are coupled between the first and second sliding mast arms 55 and 56, respectively, and the fork lift hydraulic ram 152. The fork lift hydraulic ram 152 is operatively coupled to the fork lift carriage 19 through the first and second mast chains 250 and 251.

In this embodiment, the fork lift mast assembly 16 includes first and second pivot mast arms 21 and 22 pivotably connected to the first and second mounting beam 30 and 33, respectively. In particular, the first and second pivot mast arms 21 and 22 pivotably connected to the corresponding first and second mounting beam 30 and 33 through actuators 45 and 46, respectively. In this embodiment, the first and second pivot mast arms 21 and 22 are C-channel beams.

In this embodiment, the fork lift mast assembly 16 includes first and second sliding mast arms 55 and 56 slidingly engaged with the first and second pivot mast arms 21 and 22, respectively. The first and second sliding mast arms 55 and 56 slide relative to the first and second pivot mast arms 21 and 22 in response to actuating the fork lift hydraulic ram 152. In this embodiment, the first and second sliding mast arms 55 and 56 are I-channel beams.

As shown in FIG. 1B, the fork lift 15 is provided as a separate apparatus that is retrofitted to an existing truck. Alternatively, the fork lift 15 may be provided as an integral part of a truck during manufacture. In either case, all or part of the fork lift 15 may be easily removed to enable more space and/or other uses of the truck bed 27, such as for hauling loads that will not otherwise fit in the bed 27. In FIG. 1B, the fork lift is shown as a separate apparatus that may be removed together with the beams 30, 33. The beams 30 and 33 that support the truck fork lift 15 may be welded or otherwise attached to flat stock material 60 as shown by welds at 63. While the flat stock material 60 is shown as a laterally extending strip near a rear end of the bed 27 and beams 30, 33 in FIGS. 1A and 1B, the flat stock material could alternatively cover a larger area of the bed 27. In fact, the flat stock material could cover almost an entire area of the bed 27. Further alternatively, the flat stock material could be provided in selected areas such as at 66 and/or 67, which may correspond to underlying cross members in a frame of the truck 18. Thus, bolts 69 may be used to connect the flat stock material 60 to the underlying cross members of the truck frame or chassis. In this embodiment, the fork lift 15 includes flat stock material 60 positioned between the first and second mounting beams 30 and 33 and the truck bed 27.

A hydraulic actuation system 70 including a control box 71 is shown schematically in FIG. 1B. The hydraulic actuation system includes pumps, solenoids, motors, hydraulic lines, and electric lines all connected as will be described below. The control box 71 is shown in a particular configuration in FIG. 1B, which functions substantially in accordance with the other embodiments described more particularly below. In any case, the control box 71 has controls for actuating the hydraulic pumps and solenoids to move the fork plate up and down and the tilt the mast in and out.

A beam cross member 72 is provided to connect the beams 30 and 33 for greater stability and strength. Furthermore, a space 75, as shown in FIG. 1A, is provided between a majority of the beams 30 and 33 and the bed 27 of the truck. This space 75 may advantageously enable the beams 30 and 33 to flex under the heavy loads that will be applied thereto during use. It is to be understood that the flat stock material 60, 66, 67, cross member 72, and other structural members may alternatively include strengthening contours in order to advantageously increase a strength to weight ratio of the mounting and strengthening structure of the fork lift 15 and the truck frame. Hence, in this embodiment, the first and second mounting beams 30 and 33 are spaced apart from the truck bed 27. In these embodiments, the mounting beams 30 and 33 are positioned above the truck bed 27 of the truck 18.

Figure 1C:
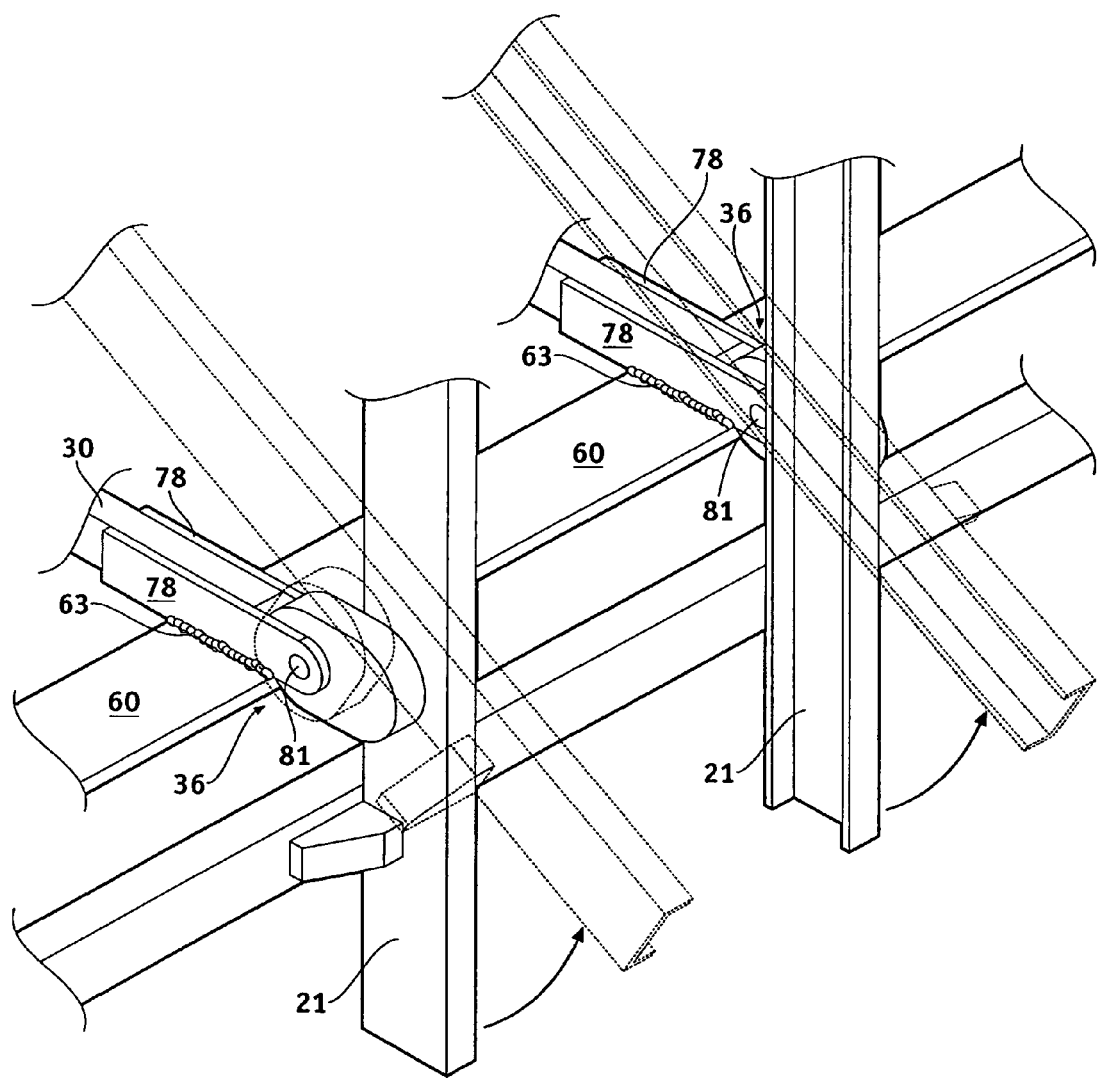
FIG. 1C is a close-up perspective view of a portion of the fork lift of FIGS. 1A and 1B.

As shown in FIG. 1C, a pair of frame members 78 may straddle each of the mounting beams 30 and 33 and form brackets with pivot holes 81 for the pivot connections 36 with the mast 21. A fork plate 84 may be slideably supported on the mast 21 in a known manner. Forks 24 may be supported on the fork plate 84. As shown in FIGS. 1A and 1B, the forks 24 may be pivotally and slideably connected to the fork plate 84 by sleeves 87 that engage a rod 90 of the fork plate 84. Thus, when the mast 21 is folded into the stowed position lying generally flat in the bed 27 of the truck 18, the forks 24 can be manually rotated so that tips 93 rotate and engage the bed 27 of the truck 18.

As shown in FIGS. 1A and 1C, the truck fork lift 15 may further include a viewing mechanism with at least one of a camera 92 or a mirror supported on the mast, for example. One or more additional cameras 94,95,97 or mirrors may be mounted on the fork plate 84 or fork 24. These cameras 92,94,95,97, and/or mirrors, may be provided for viewing the relationship between the truck fork lift 15, forks 24, and a load during stabbing of the forks 24. A monitor 98 may be remotely located in the cab of the truck, for example, for viewing by a driver also located in a cab. The monitor 98 may thus display images captured by the at least one camera 92, 94, 95, 97 for viewing by a driver while seated in the cab and operating the truck to stab the fork. When mirrors are implemented, it is to be understood that a durable stainless steel device can provide a durable yet effective mirror.

Figure 2A:
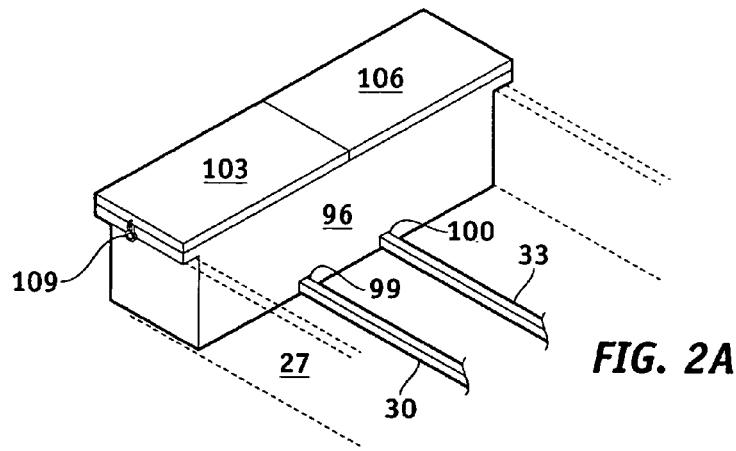
FIG. 2A is a perspective view of a tool box engaged with mounting beams of the fork lift of FIGS. 1A and 1B.

As shown in FIG. 2A, forward ends of the beams 30 and 33 may be supported in the bed of the truck in a special manner, which may be in addition to the flat stock material mounting of the beams 30 and 33 in the bed 27 of the truck as described above. As shown, a toolbox 96 may be provided in the bed 27 of the truck. The toolbox 96 may be mounted in the bed 27 adjacent to the cab. The toolbox 96 may be mounted to the truck frame through the bed 27 in a secure manner similar to the mounting of the flat stock material described above. The toolbox 96 may have two openings 99 and 100 near a base thereof, which openings 99 and 100 may be reinforced by respective channel members extending in the fore and aft direction. The channel members may have large enough openings to receive the beams 30 and 33. Hence the toolbox may be secured to the bed 27 of the truck and the underlying frame, and the beams 30 and 33 may likewise additionally be secured to the truck by the tool box 96 and the channel members. The toolbox 96 may have lids 103 and 106 for accessing an interior of the toolbox 96. One or more padlocks 109, or other locking device(s), may be used to secure one or both lids 103 in a closed condition to protect tools and other components against access by unauthorized persons. Hence, in this embodiment, the fork lift 15 includes tool box 96 positioned on the mounting beams 30 and 33. The tool box 96 is positioned at an opposite ends of the mounting beams 30 and 33 from the fork lift mast assembly 16. The tool box 96 includes first and second channels 99 and 100. The proximal ends of the first and second mounting beams 30 and 33 extending through the first and second channels 99 and 100, respectively.

Figure 2B:
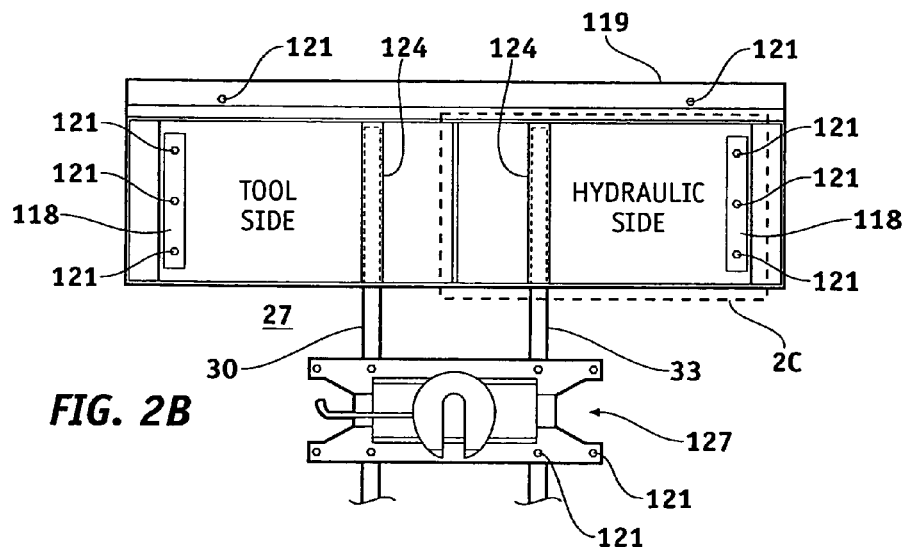
FIG. 2B is a top view of the tool box of FIG. 2A engaged with the mounting beams of the fork lift of FIGS. 1A and 1B.

FIG. 2B is a top plan view including an interior of the toolbox 96 and the beams 30 and 33. The toolbox 96 may have an interior 112, (shown in an empty condition in FIG. 2B.) The toolbox 96 may be attached to the bed 27 of the truck by angle iron 119 extending along a forward base of the tool box 96. The angle iron 119 may be fixed to the tool box and bolted by bolts 121 or otherwise connected to frame members of the truck through the bed 27. Alternatively or additionally, a bottom wall 115 of the toolbox may be attached to the bed 27 of the truck by channel iron 118 or flat stock material. The channel iron 118 may have holes therethrough corresponding to holes in the bottom 115 of the toolbox and holes through the bed 27 of the truck. Bolts 121 may be used to secure the channel iron 118 and the toolbox 96 to the bed 27. The bolts 121 may engage in a frame of the truck below the bed 27. As shown, The channel members for receiving the mounting beams 30, 33 may be closed channels 124 that may be fixed to and extend through a bottom portion of the toolbox 96. These closed channels 124 open rearwardly into openings 99 and 100 shown in FIG. 2A. Thus the beams 30 and 33 may be received in the closed channels 124 for a secure attachment of the beams 30 and 33 to the truck bed 27 and the underlying truck frame.

FIG. 2B also shows a fifth wheel hitch 127. This fifth wheel hitch 127 may be secured directly to the beams 30 and 33, to one or more of a cross member, the flat stock 15 material, and the truck frame through the truck bed 27. To this end, the fifth wheel hitch 127 may be secured by bolts 121 or other attachment mechanisms.

Figure 2C:
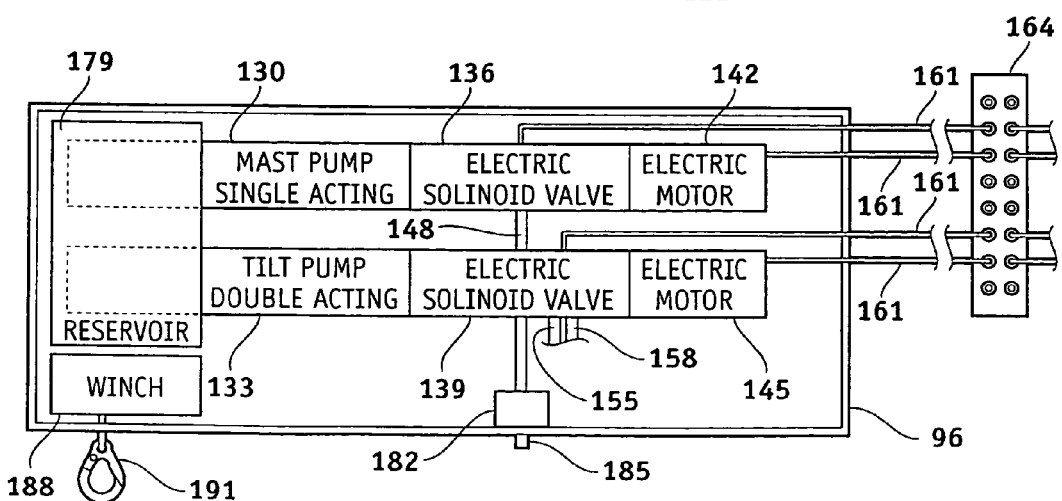
FIG. 2C is a close-up view of a portion 2C of a hydraulic side of the tool box of FIGS. 2A and 2B.

FIG. 2C is a diagrammatic top plan view of half of the toolbox 96, generally encompassing a region corresponding to the area of the circle labeled 2C in FIG. 2B. However, FIG. 2C includes components that may be located in one side or the other of the toolbox 96. These components may include, but are not limited to, a mast pump 130 that may be a single or double acting pump; a tilt pump 133, which may be a double acting pump; first and second solenoid valves 136, 139 connected to the mast pump 130 and the tilt pump 133, respectively; and first and second electric motors 142, 145 connected to respective electric solenoid valves 136, 139. A mast hydraulic line 148 may extend from the electric solenoid valve 136 to the mast hydraulic ram 152, as may be appreciated from viewing FIGS. 2C and 1B. A tilt "in" hydraulic line 155 and a tilt "out" hydraulic line 158 may be connected to the electronic solenoid valve 139 and to the one or more tilt hydraulic rams 45.

Electricity may be carried to each of the electric motors and each of the electric solenoid valves from the truck's electrical system, a separate electrical system, or a battery by electric lines 161. These lines may be connected to a contact strip 164 which may be mounted on an inner wall of the toolbox 96 or at any other location. Corresponding electric lines may extend from the contact strip to respective control boxes 167 and 170. These control boxes may incorporate double pole-double throw spring center toggle switches. The control boxes 167 and 170 may be separate from each other or joined together as shown in FIG. 2D. The control boxes 167 and 170 may be mounted on a dash board or other stationary location, or they may form part of a pendant 173 that provides a measure of mobility to the user while operating the controls. In this regard, an electrical cable 176 connecting the power strip 164 to the control boxes 167 and 170 may have a length of between 4 feet and 8 feet, for example, to permit a user to control the fork lift 15 from within the cab, outside the cab near the truck bed, or at a small distance from the truck. The cable 176 may be connected to the control boxes by a strain relief connection to 15 reduce strain on the wires within.

As shown in FIG. 2D, the spring center toggle switch 171 may control the single acting mast pump motor 142 and valve 136 to cause the mast to move in an upward direction, a downward direction under the influence of gravity, or to remain in a neutral stationary position as indicated by up, down, and central positions labeled on the control box 167. Alternatively, the pump motor 142 may be a double acting motor for activation in both directions. Similarly, the spring toggle 172 connected to the tilt pump motor and valve may be operated to cause the fork lift 15 to be tilted out, tilted in, or to remain in a stationary position. The corresponding positions for the spring biased toggle 172 are shown in FIG. 2D. Each of the spring toggles 171 and 172 are spring biased to a central neutral position. Therefore, the fork lift will remain in a stationary condition unless a user moves the toggle switches 171 or 172 from the neutral position into up, down, out, or in actuation positions.

It is to be understood that the present invention may thus incorporate an electric over hydraulic control system in which each position of actuation is in either an "on" or an "off" position. In order to control the speed of actuation of the rams, a restriction in the hydraulic system may be provided. Thus, relatively small movements of the fork lift may be effectuated. For fine adjustments in position, the toggles 171 and 172 can be bumped on and off for very small incremental changes in positions. Alternatively, a more complex proportional electric over hydraulic system may be implemented. Further alternatively, a purely hydraulic actuation system could be incorporated. However, doing so would require hydraulic lines to be routed into the cab of the truck, or to whatever location from which the user would actuate the system.

The electric over hydraulic system may be provided by a wireless control system with a wireless control box 177 wirelessly connected to the pumps by a transceiver/converter 178 as shown in FIG. 2E. The transceiver/converter 178 may receive and/or transmit radio frequency signals from and to the wireless control box 177 through the air. The transceiver/converter may also convert the signals from radio frequency to command signals that control the solenoids 136, 139 and the motors 142, 145. The transceiver portion of the transceiver/converter may implement a simple receiver in accordance with the present invention.

The control box 177 of FIG. 2E may include elements similar to those described with regard to the control box 167 of FIG. 2D above. For example, the control box 177 may include a spring center toggle switch 379 that controls the single acting mast pump motor 142 and valve 136 to cause the mast to move in an upward direction, a downward direction under the influence of gravity, or to remain in a neutral stationary position as indicated by up, down, and central positions labeled on the control box 177. Similarly, a spring toggle 382 connected to the tilt pump motor and valve may be operated to cause the fork lift 15 to be tilted out, tilted in, or to remain in a stationary position. The corresponding positions for the spring biased toggle 382 are shown in FIG. 2E. Each of the spring toggles 379 and 382 are spring biased to a central neutral position. Therefore, the fork lift will remain in a stationary condition unless a user moves one or more of the toggle switches 379 and 382 from the neutral position into up, down, out, or in actuation positions. As shown, the control box 177 may include additional buttons for controlling the fork lift 15. For example, a bypass button 385 may be provided for bypassing a restriction in the lines that usually slows the rate at which the ram moves. Thus, the bypass button 385 may be pressed to increase a speed of descent of the forks when, for example, they have no load so that they would otherwise descend slowly. Another safety or activation button 388 may be provided on a different face of the control box 177. In order to actuate the system in any way with the switches 379, 382, and possibly even bypass button 385, a user may be required to also press the safety button 388. It may be required to hold down the safety button 388 in order for power to be supplied to the other switches 379, 382 and/or bypass button 188. An additional main manual on/off switch may be lo provided on an outside of the tool box 96, for example, to provide power to the system including the control box 177. It is to be understood that the control box 71 shown in FIG. 1A may include the same features described with regard to the control box 177 and may vary therefrom in that the control box 71 of FIG. 1A is connected to the hydraulics components by wires.

As shown in FIG. 2C, a larger hydraulic reservoir 179 may be implemented with the present system to accommodate the large capacity of the mast lift hydraulic ram 152 and the one or more tilt rams 45 of the fork lift 15. Additionally, a diverter valve 182 with a manual lever 185 may be provided to manually swap the connection of the mast pump to one or more trailer supporting rams as will be described in greater detail below. The diverter valve 182 is connected to each of the fork lift hydraulic ram 152 and one or more trailer supporting hydraulic rams 186 as shown in FIG. 1B, and as shown and described below in greater detail. It is to be understood that the diverter valve 182 may include a solenoid and may be controlled from the control box 71, 173, or 177 similarly to the control of the pumps and valves associated with motors 142, 145. The toolbox 96 may also have a winch 188 supported therein, and a winch cable 191 may be extended through a wall of the toolbox 96 as shown in FIG. 2C. Among other things, the winch 188 can be used to pull a loaded pallet along a trailer bed by way of the cable 191, as shown and described with regard to FIG. 3B below.

The truck fork lift 15 in combination with the truck 18 may be used together with other devices shown in FIGS. 3A-5B to provide a more comprehensive lifting and hauling system. As such, the hauling system may include a trailer 200 with a goose neck tongue 203 for a connection with the fifth wheel hitch 127. The system may also include a pallet buggy 206, which may be carried on the trailer 200 together with a load which may include pallets 209, for example. The trailer may include stowable ramps 212, 215, and 218, which can be slid into ramps carriers 221 for storage during periods of transport and non-use. It is to be understood that the ramps 212, 215, and 218 and the ramp holders 221 may be located at any position along the trailer. In particular, it is to be understood that the trailer will need to be loaded with a greater amount of the overall weight centered slightly forward from the center of the trailer. Thus, it is to be understood that the relative positions of the loaded pallets 209 and the pallet buggy 206 can be varied depending upon the particulars of the load to be carried. The trailer 200 may be any of a variety of trailers, but should have a rating greater than or equal to any maximum that will be hauled on the trailer for safety purposes.

Figure 3A:
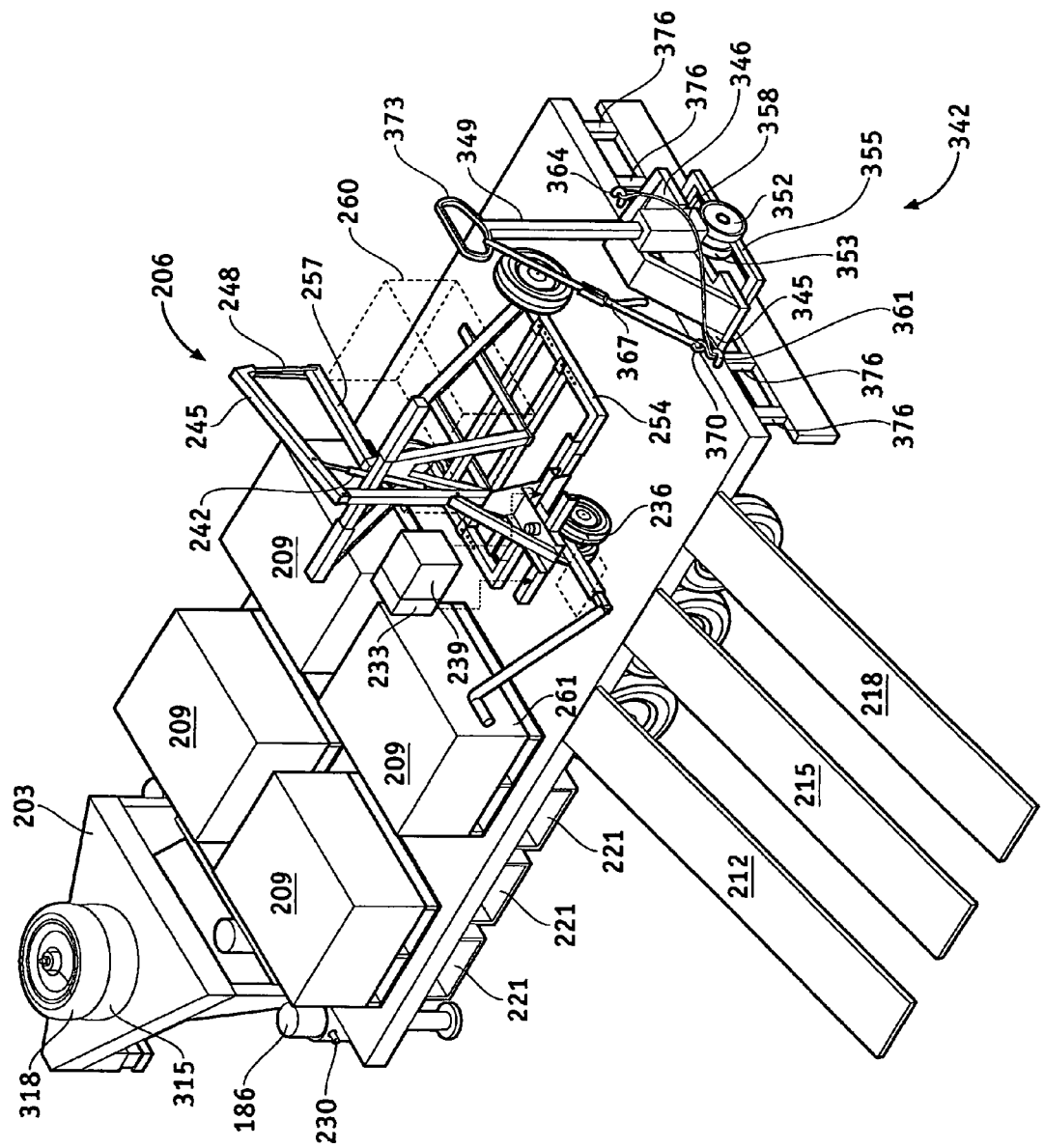
FIG. 3A is a perspective view of a trailer.

As shown in FIG. 3A, one or more trailer supporting rams 186 may be provided at respective corners of the trailer. Alternatively, a trailer ram 186 could be provided generally centrally located along a front edge of the trailer bed as shown in FIGS. 3B and 3C. FIG. 3C is a diagrammatic end view of the trailer 200 taken generally in a direction of arrow 3C of FIG. 3B. The rams 186 may have a stowed position in which the rams are retracted upwardly and a position of use in which the rams are slid downwardly through a sleeve 227 and locked in a position of use by a pin 230 as shown in FIG. 3A, for example. The rams 186 could alternatively be mounted to rotate in and out of a position of use on a pivot 228 as shown in FIGS. 3B and 3C. Thus, when it is desired to remove a loaded trailer 200 from a truck, the trailer and load may be supported by the trailer rams 186 and moved to an unhitched condition by the rams 186. Actuation of the rams 186 may be provided by a hydraulic pump such as the mast pump 130. As indicated above, a diverter valve 182 may be provided to alternatively connect the pump 130 and solenoid valve 136 of the mast hydraulic ram 152 to the trailer hydraulic rams 186. The trailer hydraulic rams 186 may be simultaneously fed by a single line 148 that is divided severally into as many lines as there are trailer rams 186. It is to be understood that additional trailer rams 186 could be provided at rear corners or elsewhere on the trailer for increased stability and/or versatility.

As shown in FIGS. 3B-3C, manually slidable telescoping stands 231 may include pins 230 for manually adjusting an extent of the stands 231 in a downward direction to engage the ground in a position of rest after the trailer ram(s) 186 have been used to raise the trailer. Once the stands 231 have been extended, the trailer ram(s) 186 may be released. Thus, the trailer may be provided with a great degree of stability while loading and unloading. As shown in FIG. 3B, the winch cable 191 may be routed from the winch to a loaded pallet 209 and engaged around a base of the pallet 209 for the purpose of moving the pallet along a bed of the trailer 200. Thus, the pallet 209 may be repositioned or oriented for engagement with the forks of the truck fork lift 15. In order to protect the fork lift ram 152, the winch cable 191 may be threaded through a guide 232 that holds the winch cable 191 out of engagement with the fork lift ram 152 while pulling the pallet 209, for example. The winch cable guide 232 may be supported on a lower edge of the fork lift plate 84 as shown in FIG. 3D, which is a view of the fork lift mast taken generally in a direction of arrow 3D of FIG. 3B.

As shown in FIGS. 3B and 3D, the truck fork lift 15 may include a take up reel 303 that may be mounted on an underside of a rear portion of the truck frame or bed 27. This take up reel may be biased to draw in a line 306 that has one or more video cables and power to the one or more respective cameras 92, 94, 95, 97 shown in FIG. 1A. Thus, the video and power cables may be fed into an inner end of the line 306 on the take up reel 303. As the mast is raised or lowered, an outer end of the line 306 may be withdrawn from the reel 303 to provide the needed slack as the camera is moved together with the mast 21, fork 24, or fork plate 84. The line 306 may extend over a pulley 309 that may be rotatably mounted on a shaft 312 that also supports one or more chain pulley for lifting the fork plate 84. Likewise, as the fork plate is moved in a direction requiring a shorter length of the line 306, the take up reel 303 will automatically retract and wind a portion of the line 306 on the take up reel 303. In this way, the take up reel 303 reduces the chances of a loose line that may become tangled or drag on the ground during use of the truck fork lift 15. At the same time, continuous viewing of images may be provided as the forks are adjusted to greater or lesser heights, without the need of keeping track of the lines to the camera.

When the take up reel 303 is mounted under a rear portion of the truck bed 27, the customary location for the truck spare tire will be occupied by the take up reel 303 and the housing that supports the take up reel 303. As shown in FIGS. 3A, 3B, and 3C, one or more spare tires 315, 318 may be supported on the trailer goose neck 203. For this purpose, a post 321 may be supported on and extend upwardly from the goose neck 203. Thus, spare trailer and/or truck tires 315, 318 may be conveniently supported for easy retrieval, as needed.

FIG. 3A also shows a manual pallet dolly 342 that may be supported on a rear of the trailer 200. The pallet dolly 342 has a pair of forks 345, 346 configured to engage in a pallet. The pallet dolly also has a jacking handle 349 that jacks up a load placed on the forks and also steers the dolly during use. A pair of closely spaced wheels 352, 353 are connected to the jacking handle. This pallet dolly is known, but is not typically supported on a trailer in the manner shown in FIG. 3A. There are three primary securing mechanisms that safely hold the pallet dolly on the trailer 200. Firstly, a stopping cross bar 355 is mounted on a bumper 356 in a downwardly and rearwardly extending position. As shown, the closely spaced wheels 352, 353 straddle the stopping cross bar 355 and engage the stopping cross bar generally at an axle between the wheels 352, 353 under the force of gravity. This mechanism will inhibit separation of the pallet dolly from the trailer 200 under most circumstances during pulling of the trailer 200 by a truck. Secondly, the pallet dolly 342 is secured by a blocking cable 358 permanently connected to a first ring 361 mounted on the trailer bed frame and removably connected to a second ring 364 mounted to the trailer bed frame. The connections may be formed by cable clamps and openable links, for example. As shown, the cable forms a support strap that engages the pallet dolly on a rear side thereof and extends forwardly and laterally outward to the rings 361, 364 when the blocking cable 358 is in a connected state. As such, even if the closely spaced wheels 352, 353 were to clear the stopping cross bar 355 during a bumpy ride, for example, the blocking cable would prevent rearward movement of the pallet dolly away from a rear end of the trailer 200. Thirdly, a tightenable strap 367 having a hook 370 connected thereon is looped through a closed ring 373 of the jacking handle 349. The hook may be engaged in the first ring 361, and the strap may be tightened to provide a securing tension that will hold the pallet dolly in place on the trailer. The bumper 356 is mounted on the trailer 200 by vertical spacers 376 that form spaces between an underside of the bed of the trailer and the bumper 356. These vertical spacers 376 may be located close to outer sides of the pallet dolly in order to inhibit sideway movement of the pallet dolly 342 when the trailer 200 is being pulled with the pallet dolly 342 supported thereon.

As shown in FIGS. 3A and 4A-4C, the pallet buggy 206 is powered by a motor 233 that drives a wheel 236. The motor also runs a hydraulic pump and reservoir system 239 that is connected to a buggy ram 242. The buggy ram 242, in turn, raises and lowers a buggy crane arm 245. A proximal end of the buggy crane arm 245 is pivotally connected to a vertical frame member 251 of the pallet buggy frame 254. The buggy crane arm 245 has a cable 248 connected to a distal end thereof. A lower end of the cable 248 is connected to a suspended fork 257, which engages and supports a load such as pallet 260, as shown in FIGS. 3A and 4A-4C. Thus, actuation of the pallet buggy ram 242 raises or lowers the crane arm 245 and the suspended pallet fork 257 to raise or lower the load 260, as desired.

The pallet buggy 206 advantageously provides a device that can be maneuvered into and out of tight spaces for picking up and moving loads. For example, if a load needs to be moved into a shelter or structure that has a low clearance opening, the pallet buggy 206 is well adapted for delivering a load into such a structure. The pallet buggy 206 is also an all-terrain vehicle that can maneuver over contours and soil hardness of great variation. The pallet buggy 206 may also be maneuvered and steered by a steering lever 261, for example, connected to the rear wheel(s) 236 in order to navigate turns. On the other hand, front wheels 263 are positioned to support the frame 254 of the pallet buggy. The motor 233 and the hydraulic system 239 may be mounted on a platform that is pivotally connected to the frame 254 by a vertically oriented pin, for example. Thus, the turning may be effected by pivoting a rear portion of the pallet buggy relative to a front end thereof.

Figure 4A:
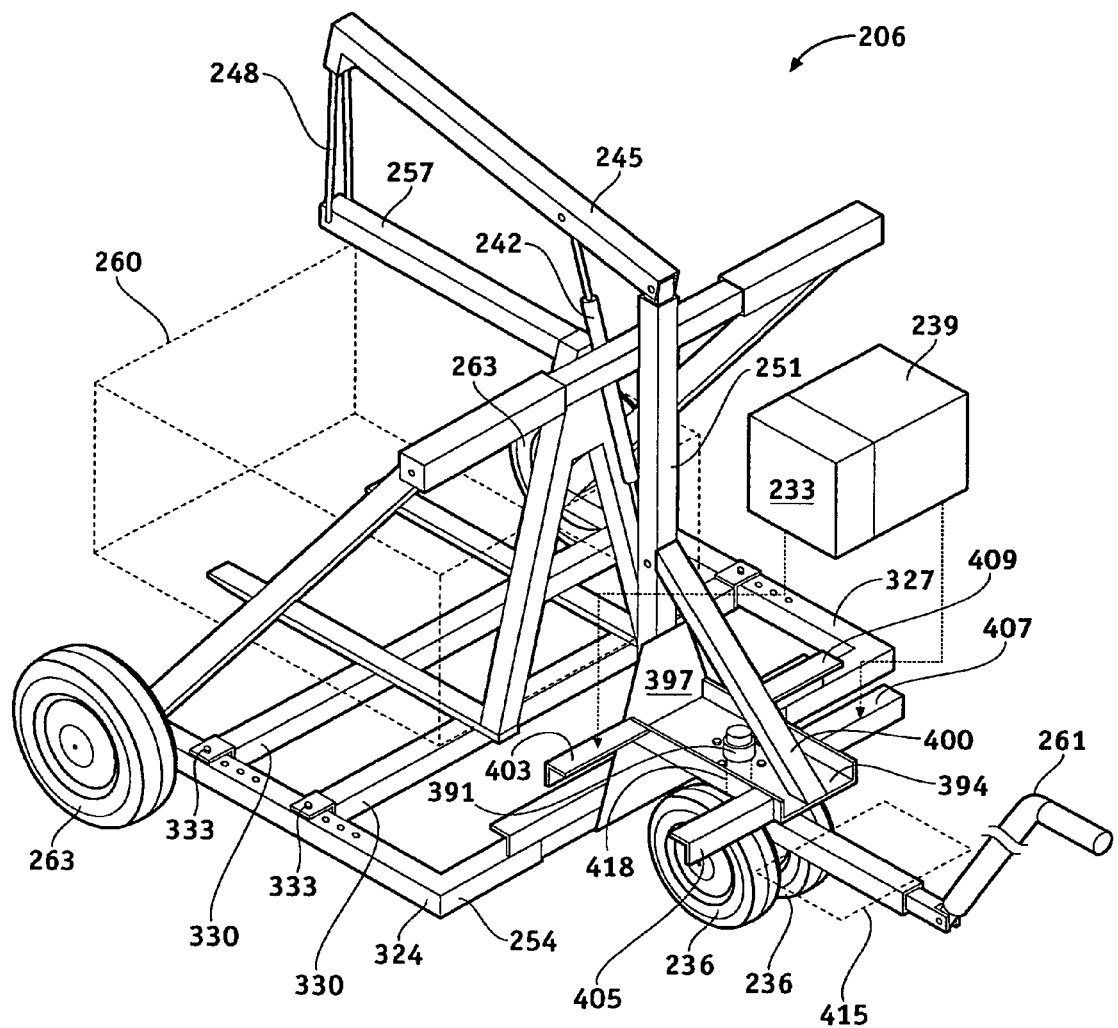
FIG. 4A is a perspective view of a pallet buggy of FIG. 3A.
Figure 4B:
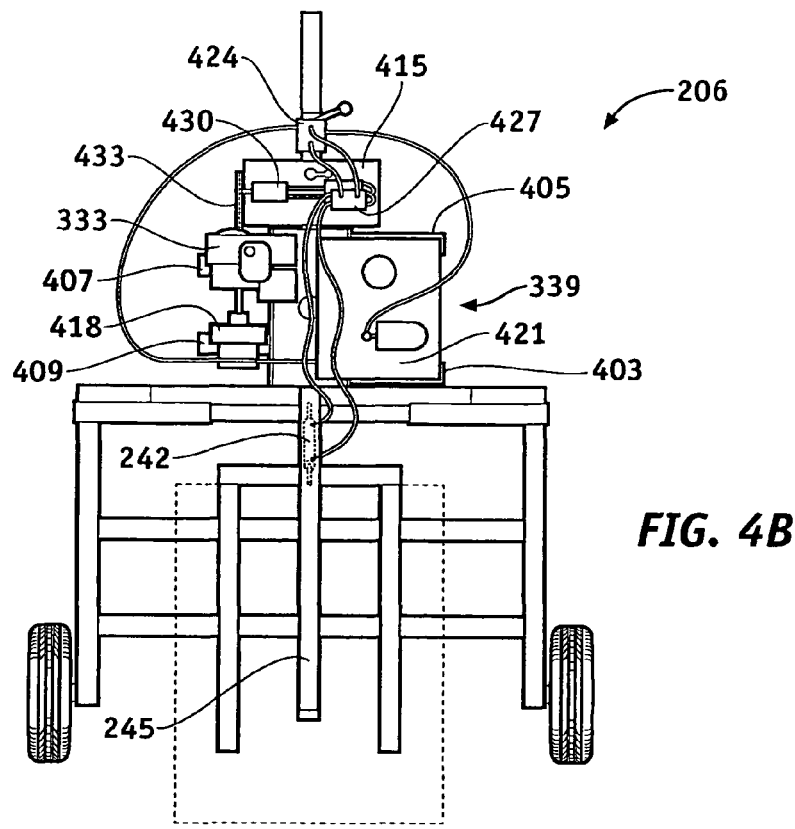
FIG. 4B is a top plan view of the pallet buggy of FIG. 4A.
Figure 4C:
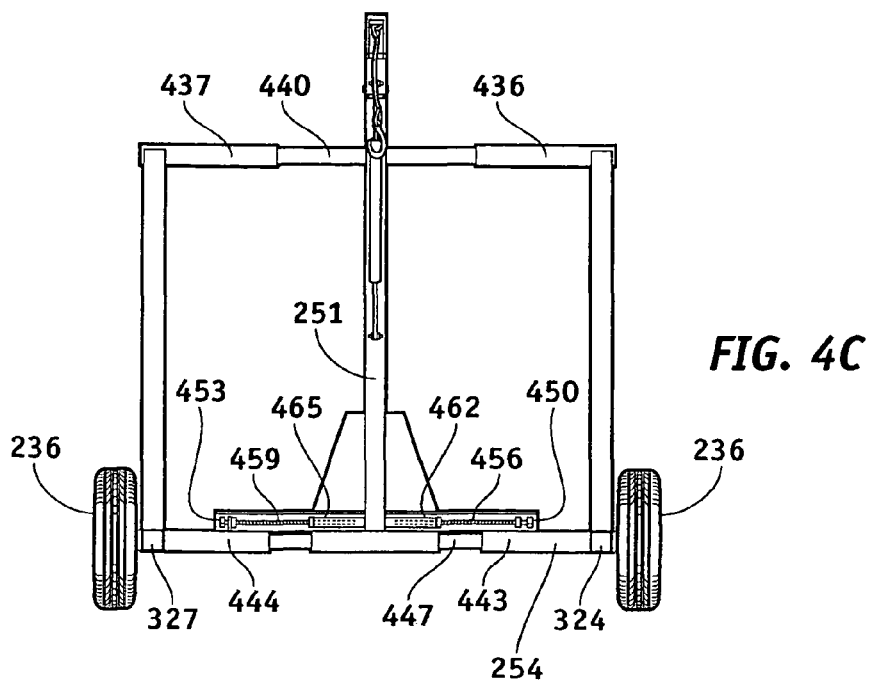
FIG. 4C is a front plan view of the pallet buggy of FIG. 4B taken in a direction of arrow 4C.

The frame 254 is configured to support loads of three times or more than a weight of the pallet buggy 206 itself. That is, the pallet buggy may weigh a 1,000 pounds or less while being able to support and transport loads of 3,000 pounds or greater. As shown in FIGS. 4A-4C, the pallet buggy frame 254 may have outer lateral frame arms 324, 327 that generally straddle a load 260 to be born. Then the load 260 may be raised, and load platform cross bars 330 may be placed below the load 260 and locked into place on the frame arms 324, 327 by pins 333, for example. Then the load 260 may be lowered onto the load platform cross bars 330 for transport. The load platform cross bars 330 may be formed of closed or open channel members with upside down L-sectioned end brackets stoppingly engaging an upper surface of the frame arms as shown in FIG. 3E.

As shown in FIG. 4A, steering of the pallet buggy may be achieved by a articulating the rear wheels 236 relative to the frame 254. A steering pivot assembly 391 may be mounted to an underside of a channel member 394. A steering shaft 395 may extend downwardly and be pivotable with the wheels 236 about a vertical axis, while a hub of the pivot assembly may protrude upwardly through the channel member 394. The steering pivot shaft 395 of the steering pivot assembly may thus pivot on a generally vertical axis. The channel member 394 may be mounted to the frame 254 by a gusset member 397 and an angled member 400 for increased strength. Motor and hydraulic support members 403, 405, 407, and 409 may be fixed to the channel member 394. These members 403, 405, 407, and 409 may receive and support the motor 333, and the hydraulic pump and reservoir 339, as shown. A hydraulic motor and valve platform 412 may be slideably supported on a steering bar 415 rigidly connected to the steering shaft 395. The steering lever 261 may be connected to an outer end of the steering bar 415.

FIG. 4B shows a top plan view of the pallet buggy 206 with the motor 333 and the hydraulic pump and reservoir supported on the support members 403, 405, 407, and 409. The motor 333 drives a hydraulic pump 418, which draws hydraulic fluid from a reservoir 421 and moves it through a closed loop. A lever control valve 424 controls whether the hydraulic fluid is routed directly back through the reservoir 421, when in a neutral position, or in one of first and second directions through a diverter valve 427. When the lever control valve 424 is pulled all the way back, the fluid may be forced in a direction to raise a load or drive the wheels 236 in a rearward direction. When the lever control valve 424 is pushed all the way forward, the fluid may be forced in a direction to lower the load or drive the wheels in a forward direction. The diverter valve 427 determines whether the fluid is routed to the pallet buggy ram 242 or to the a hydraulic motor 430. Thus, the diverter valve also provides a safety mechanism. That is, the pallet buggy 206 in this configuration cannot lift by the pallet buggy ram 242 and drive the pallet buggy wheels 236 at the same time. When the diverter valve routes the fluid toward the hydraulic motor 430, the hydraulic motor 430 may drive the wheels 236 by a chain 433, for example. The direction of the driving force is adjusted by the user as he engages the lever control valve 424. Similarly, the user may selectively raise or lower the crane arm 245 with the same lever control valve when the diverter valve has been adjusted to route the fluid through the ram 242.

FIG. 4C is a front plan view taken along a direction of arrow 4C of FIG. 4B. As shown, the frame 254 may be a laterally expandable frame in which a spacing of the lateral frame arms 324, 327 may be adjusted to match a load width as needed. Upper cross bar sleeves 436,437 may slideably engage an upper cross bar 440. Similarly, lower cross bar sleeves 443,444, may slideably engage a lower cross bar 447. To adjust the width of the pallet buggy, forces may be removed from the frame by hoisting the buggy 206 nearly or completely out of engagement with a ground surface. Then the user may engage heads 450 and 453 with a power wrench or other turning device, and turn threaded shafts 456 and 459 in or out of threaded sleeves 462 and 465, respectively. At a most retracted position, the threaded shafts may engage a stop, which may be provided by an outer wall of the vertical frame member 25 1. In this position, the pallet buggy may be narrow enough to fit in a standard width bed of a pick up truck for easy hauling the pallet buggy.

FIG. 5A is a side plan view and 5B is a top plan view of a stanchion 266 for supporting and storing the truck fork lift 15 when it is not mounted to the truck 18. The stanchion 266 may include two elongate skids 269, 270 in the form of channel members. A plurality of vertically extending frame members 272 and 275 may be fixed to the skids 269, 270 and extend upwardly therefrom. Diagonal strengthening members 278 may also extend in a vertical direction as well as a horizontal direction diagonally up from the skids 269 to a horizontal frame member 281. The skids 269, 270, and the combination of vertical, horizontal, and diagonal frame members 272, 275, 278, and 281 may support fork receivers 284. The fork receivers 284 may be rectangular tubular channels with open ends to receive the forks 24 of the truck fork lift 15.

Figure 5B:
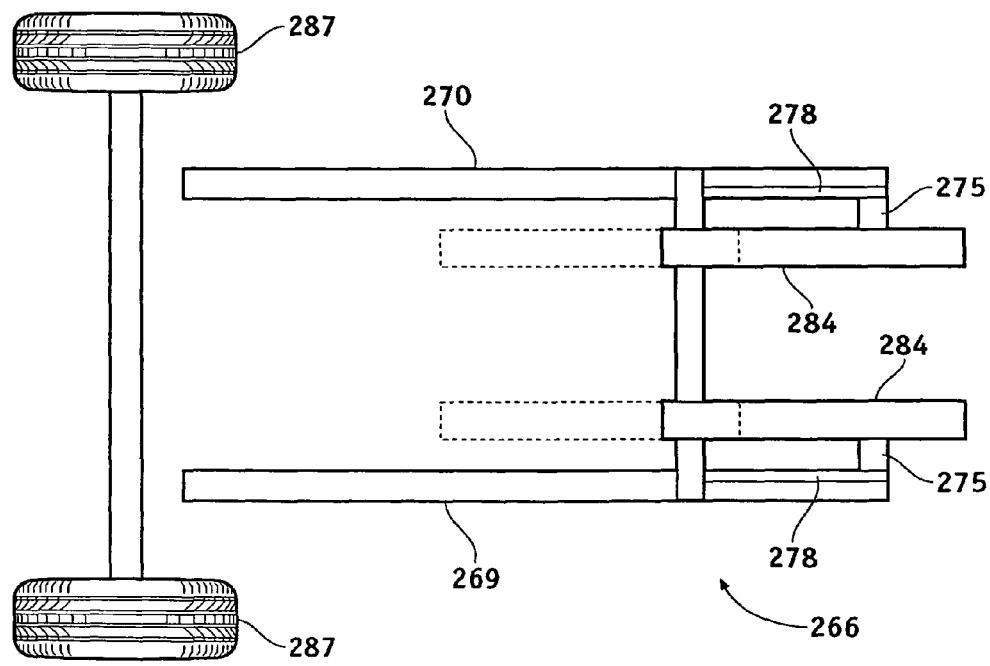
FIG. 5B is a top plan view of the fork lift stanchion of FIG. 5A.

Thus, a truck 18 may be backed up so that the forks 24 are stabbed into the receivers 284. Then the truck fork lift may be operated to transfer the load of the fork lift 15 to the stanchion. Before the load is transferred in this manner, the bolts 69 that secure the beams 30, 33, and/or flat stock material may be removed from the truck frame 336 by disengaging a nut 339 that may be welded or otherwise secured to the truck frame 336, as shown in FIG. 5A. Any hydraulic lines may be disconnected from the hydraulic pumps, and any electrical and video cables may be disconnected. The hydraulic lines to the truck fork lift 15 may be disconnected by a quick disconnect, for example. All loosening of the bolts and disconnections of the lines may be easily made within approximately three minutes. And it may take only ten minutes to completely remove the fork lift including the mast and mounting beams together with the hydraulic rams and the components mounted to these members. The hydraulic pumps, controls, and monitor may remain connected to the truck. In separating the truck fork lift from the truck, the beams 30 and 33 may be slid out of the channels 124 in the toolbox 96, when the channels 124 form part of the mounting of the truck fork lift 15. As shown in FIGS. 5A and 5B, the skids 269, 270 may be set at a width narrower than the rear wheels 287 of the truck 18 so that the truck may generally straddle the skids 269, 270 during transfer of the truck fork lift 15 from the truck bed onto the stanchion 266. As shown by dashed lines in FIGS. 5A and 5B, the fork receivers 284 may be positioned fore or aft on the frame members of the stanchion 266, depending upon the desired load distribution.

FIG. 6A is a front plan view of fork lift 15 with a fork lift carriage 500 in a locked position. The fork lift carriage 500 includes an upper member 502, a lower member 504 and support bars 506 and 508. The fork lift carriage 500 is held in a locked position which inhibits the inadvertent movement of the fork lift carriage 500 relative to the mast 21 and enables proper usage of an attachment tool that may be attached to the fork lift carriage 500. Any of a variety of mechanisms may be implemented in order to retain the fork lift carriage 500 in a locked position. For example and without limitation, the fork lift carriage 500 may be retained in a locked position by use of a tension element 510. The tension element 510 includes a rod 512, a cylinder 514 configured to receive the rod 512, a locking pin 516 and a securing pin 518. The tension element 510 is connected to the fork lift carriage 500 and the mast 21. The locking pin 516 is inserted through corresponding apertures within the rod 512 and cylinder 514 in order to attach the rod 512 and cylinder 514 together at a predetermined set relative position that also establishes a predetermined length of the tension element 510. The locking pin is inserted and held in place against inadvertent falling out by the securing pin 518. Retaining the fork lift carriage 500 at a set position relative to the mast 21 with the tension element 510 in this way provides the desired inhibited movement required to operate the attachment tools. It is to be understood that the rod 512 and the cylinder 514 may be secured to each other in any of a variety of predetermined relative positions corresponding to respective predetermined lengths of the tension element 510.

Referring to FIGS. 6A and 6B, a locking bolt 520 is inserted through the lower member 504 of the fork lift carriage 500 and coupled to a flange 522 of the tension element 510 in order to secure the tension member 510 to the fork lift carriage 500. The locking bolt 520 is used to lock the fork lift carriage 500 to the mast 21 when the tension element is a one piece tension element, for example. When the tension element has two or more pieces and/or is adjustable, as illustrated in FIGS. 6A and 6B, then the locking bolt 520 may be utilized in conjunction with the rod 512, cylinder 514, and the locking pin 516 of the tension element 510 in order to lock the fork lift carriage 500 in position relative to the mast 21. While the tension member is shown as having a hook or lip on the rod for securely engaging an underside of the mast base and the cylinder 514 is shown as being secured by a locking bolt 520, it is to be understood that these mechanisms may be alternatively reversed or additionally included on each of the rod 512 and cylinder 514. That is, hook or lip portions and/or locking bolts may be incorporated to secure either or both of upper and lower ends of the tension member 510 to the fork lift carriage 500 and the mast 21.

As shown in FIG. 6A and the sectional view of FIG. 6C taken along lines 6C-6C of FIG. 6A, an additional locking mechanism may be implemented to inhibit the movement of the forks 24 relative to the fork lift carriage 500. A fork lock may include a U-shaped bolt 530. The fork lock may alternatively be of any configuration adapted to retain the fork in an abutting relationship with the members or plates 502, 504. In the simple form shown in FIGS. 6A and 6C, the fork lock may include a U-shaped bolt 530 that may then be secured to the lower member 504 of the fork lift carriage 500 by use of fork lock nuts 532 coupled to each end of the U-shaped bolt(s) 530. Securing the forks to the carriage in this manner inhibits movement of the forks 24 relative to the fork lift carriage 500 when an attachment tool is attached to the forks 24 with the forks 24 in a position of use, as can be appreciated from FIGS. 6A, 6C, and 6F. It will be understood that the fork lock(s) for securing the forks 24 to the fork lift carriage 500 may be utilized independently of other locking devices or may be used in concert with other locking devices to further inhibit inadvertent movement of the forks 24 and/or the fork lift carriage 500 relative to each other and/or relative to the mast 21.

FIG. 6D is a section view taken along line 6D-6D of FIG. 1. FIG. 6D shows portions of the fork lift carriage 500 including the upper member or plate 502 and the support bar 508. The support bar 508 of the fork lift carriage 500 may have at least one carriage roller 540 supported thereon, as shown in FIGS. 6A and 6D. The roller 504 may rollably contact an inner guide or channel formed by mast elements of the fork lift 15 as the fork lift carriage 500 is moved up or down. For example, as shown in FIGS. 1A and 1B, an inner section of the mast 21 may include I-beams that form inwardly opening channels in which rollers 540 may ride. Thus, one or more stops 544 may be placed on a flange of the I-beam that forms the inwardly facing channel of the inner section of the mast 21. The one or more stops 544 may be placed to interfere with movement of the roller(s) 540 in one or both directions along a length of the channel. In particular, the stop(s) 544 may be used to inhibit movement of the carriage in an upward direction enable proper application of an attachment tool similar to the function of the tension element 510 described above.

The stop 544 may be coupled to the inner section of the fork lift mast 21 by a lock nut 546, as shown in FIG. 6D. The stop 544 may be of a configuration that is complimentary to the roller 540. This enables the stop 544 to better inhibit movement of the roller 540 when an attachment tool is in use with the fork lift 15. For example, by providing the one or more stop(s) with a complimentary concave shape that engages the roller 540 at a multitude of points on a surface, force concentrations may be reduced and the stop may thus provide a strong and positive stop. It will be understood that while it is shown that the stop 544 and roller 540 is located adjacent to the upper member 502, the rollers will typically be advantageously placed along the support bar 508 for a desirable load distribution. The stops 544 may be located in any position along the inner section of the mast 21 for positively stopping the carriage at any of a variety of predetermined positions.

As shown in FIGS. 6E and 6F, a carriage attachment assembly 550 may be connected to a fork lift via the carriage members 502, 504. The carriage attachment assembly 550 may include an upper bolt 552, a lower bolt 554, a lever 556, a locking bolt 558, an upper element 560, a lower element 562, and an aperture 564 extending through and at least partially defined by the lower element 562. The carriage attachment assembly may be coupled to the fork lift by the upper bolt 552 and the lower bolt 554. The upper bolt 552 may be coupled to the upper member 502 of the fork lift carriage 500 and the lower bolt 554 may be coupled to the lower member 504 of the carriage. Alternatively, in accordance with FIG. 6F, the carriage attachment assembly 550 may further include one or more sleeves 551 coupled to the carriage attachment assembly 550. The sleeve 551 may be configured to receive a fork 24. The fork 24 may contain a sleeve lock 553 to prevent the sleeve 551 from inadvertently sliding off of the fork 24. The fork 24 may also be in a locked position with fork lock 530 coupled to the lower member 504, as described above. This configuration may thus inhibit movement of the fork while an attachment tool is in use.

FIG. 6G shows an attachment portion 566 of an tool coupled to a carriage attachment assembly 550, with the carriage attachment assembly in an assembled state. The upper element 560 has an upper surface for contacting and retaining the attachment tool 566. The lower element 562 has a lower surface with an aperture 564 extending through and opening outwardly through the lower surface. The locking bolt 558 may be movably disposed within the carriage attachment assembly 550. The locking bolt 558 may be extensible outwardly through the aperture 564 for locking the attachment tool 566 to the carriage attachment assembly 550. The same lever 556 shown in FIGS. 6E and 6F is also present in the embodiment of FIG. 6G, and is pivoted to move the locking bolt 558 between a locked and a released position such as by cam action. However, the lever 556 is not visible in FIG. 6G because it has been rotated downward into a locking position behind the structure of the connection of the lever 556 to the locking bolt 558. The lever 556 may thus have a first lever position corresponding to a position of the locking bolt 558 in a retracted position within the carriage attachment assembly 550, as shown in FIGS. 6E and 6F. The lever may also have a second lever position corresponding to a position of the locking bolt 558 in a protracted position extending outwardly through the aperture 564 when the attachment assembly 550 has an attachment tool 566 secured thereto, as represented in FIG. 6G. This enables the attachment tool 566 to be easily and securely attached to the attachment assembly 550 and the fork lift carriage 500.

As shown in FIG. 6H, the forks 24 of a fork lift may be rotated out of their normal position of use to provide access to the fork lift carriage 500 of the fork lift. As described above, the fork lift may be supported in a truck 568. Thus, the fork 24 may be rotated out of a position of use into the bed of the truck 568. The fork 24 may be rotated until it contacts a guard 570. The guard 570 may be configured to provide protection to other components of a fork lift that are located within the bed of the truck 568. The fork lift may then be lifted thereby moving the end of the forks 24 into one or more pocket(s) 572. The pocket 572 inhibits movement of the tips of the forks 24 out of the pockets and thus holds the fork 24 in a rotated position away from the fork lift carriage 500. Rotating the forks 24 in this manner allows access to the fork lift carriage 500 of the fork lift for purposes that include, but are not limited to attaching attachment tools. It will be understood that the movement of the fork 24 to provide access to the fork lift carriage 500 may be accomplished in other ways, such as, but not limited to completely removing the forks.

FIG. 7 is a side view of a plurality of attachment tools 566 that may form a set from which a user may selectively choose. The plurality of attachment tools 566 may include one or more of backhoes 580 and 582, a rotary cutter 584, a hydraulic breaker 586, an angle broom 587, a cement mixer 590, a grader 592, a trencher 594, an auger 596 and a plurality of other attachment tools that may be configured for attachment to a fork lift in accordance with the present invention, as indicated by an ellipsis 598. Particular embodiments of the present invention may be configured to receive all possible attachment tools 566 or may be specifically configured to receive a greater or lesser number of attachment tools 566 than is shown in FIG. 7. Other configurations of attachment assemblies may be implemented to receive other configurations of attachment tools without departing from the spirit and scope of the invention.

Exemplary Methods for Delivery Service

The electric over hydraulic solenoid valves create a flexibility to remotely operate the forks from the cab or from outside the truck. Sometimes this option is needed because of a particular terrain in which stabbing a pallet is facilitated by viewing the action from a particular vantage point. Thus, loading or unloading pallets on uneven terrain can be facilitated by utilizing a cable remote control or wireless remote control system.

Truck Forklift, Pallet Buggy, and Trailer Operation

Four pallets may be loaded on the trailer at a warehouse and transported to a delivery site. The driver/user of a truck may pull in front of a driveway. The pallet buggy may be unloaded and placed in a garage in which the pallets are to be placed. (An ideal parked unload position in a residential subdivision is in a cul-de-sac with trailer centered for easy access to both sides of the trailer. Otherwise, the pallets may need to be pulled to an accessible side of the trailer by a winch and winch cable similar to that described above.) The driver/user may leave the truck running and turn a power switch of the system "on" to enable operation. Then the user may disconnect safety chains and any electrical connection between the truck and trailer. The user may deploy a drop jack "hydraulic cylinder" or ram on the trailer and make a hitch of the truck and trailer ready for release so that the trailer tongue may be raised. It is important to remember that the trailer may be loaded with up to 12,000 pounds of product.

The driver may use a quick disconnect hydraulic hose extending from the trailer hydraulic cylinder or ram to an auxiliary hydraulic output to raise and lower the trailer. The driver may raise the trailer and then disconnect the auxiliary hydraulic hose. Then the user may move the truck forward and unfold each fork from a transport position to a working position and remove securing straps from a palletized product on the trailer.

The user may back the truck up to either side of the trailer, centering on the rear pallet first. By viewing a camera monitor within the cab, the user may position the forks to stab the pallet. The user may slowly back up to the pallet while viewing a screen of the monitor. Once, a pallet has been stabbed and raised at least slightly with the forks, the user may drive slowly to a position about five feet away from trailer. Then he/she may lower the pallet to a height of approximately two feet from the ground. With the load in this position, the driver may then drive approximately five miles per hour or slower into the garage and place the pallet inside.

By always viewing the monitor as he/she is placing the loaded pallet on the garage floor, a user may avoid striking the house or garage. Likewise, the hydraulic pressure enables the user to selectively control a height of the truck fork lift including the mast. The mast may be configured to not exceed approximately seventy-nine inches in height when the truck is unloaded so as not to hit the garage door when the truck is pulled in and out of the garage. Other mast heights may be smaller or larger than seventy-nine inches.

Depending on a terrain of the ground over which the load is to be transported by the truck fork lift, a strap may be used to wrap around the palletized load and the forklift mast to stabilized the load. In this case, the strap would need to be removed before leaving the garage. Then the user may return to the trailer in the truck and repeat the above described procedure. This method of operation may reduce the unloading time approximately fifteen to twenty minutes per delivery as compared to a method that uses a crane. More importantly, the user or operator may remain in the cab when moving and unloading the pallet from the forks.

In some cases, the palletized loads may need to be placed in a garage having a vertical clearance lower than the minimum height of the truck fork lift mast, or the loads may need to be maneuvered in a manner that is difficult to achieve with the truck fork lift. In these cases, the palletized load may be set on the ground at any convenient location, and the pallet buggy may be used to engage, lift, place the load on a support frame of the pallet buggy, and transport the load to a location for final placement of the delivery. As such, the pallet buggy may be used to move the pallet into the garage when a passage is too narrow for the truck fork lift, for example. In a case where there is no paved driveway, the truck may be backed up to a sheet of plywood that has been previously placed on a pair of flat pallets, for example. The palletized load may be placed on the sheet of plywood by the truck fork lift. Then the palletized load may be moved with the pallet buggy into the location of final placement of the delivery within the garage.

While the drawing Figures and much of the disclosure above are presented in the context of a fork truck or fork lift that may be supported on a conventional or modified pickup truck, it is to be understood that the teachings of the present invention may be applied to any vehicle. Any of a variety of vehicles may support the fork lift and/or attachment tools of the present invention. These vehicles may be broadly referred to by a minimum weight rating such as a rated vehicle of ¾ ton or more, or they may be referred to by a range of weight ratings, for example. Vehicles in accordance with the present invention may include cabovers, pickup trucks, modified pickup trucks, including pickup trucks with the beds removed, and/or the suspensions enhanced. The vehicles may further include small or large vehicles that are not intended to be driven on regular roads. The vehicles with which the present invention may be implemented may include all terrain vehicles and/or highway vehicles. The attachment tool aspects of the present invention may be applied to conventional fork lifts (including all terrain fork lifts), or non-conventional fork lifts alike. Conventional fork lifts include dedicated forklifts that are non-truck mounted fork lifts.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, other types of actuators may be implemented in place of the hydraulic actuators described above. These actuators may include electric actuators, pneumatic actuators, magnetic actuators, and/or mechanical actuators without departing from the spirit and scope of the invention. The electric actuators may include a lead screw and nut combination driven by a motor, for example.

What is claimed is:
1. A vehicle, comprising:
a vehicle frame;
a vehicle body carried by the vehicle frame;
a mounting beam, the vehicle body extending between the vehicle frame and mounting beam;

a detachable attachment mechanism connecting the mounting beam to the vehicle frame, the detachable attachment mechanism extending through the vehicle body;
a fork lift mast pivotably connected to the mounting beam;
a tilt actuator connected between the mounting beam and fork lift mast;
an attachment tool coupled with the fork lift mast;
a carriage attachment assembly carried by the fork lift mast, the attachment tool being coupled with the fork lift mast through the carriage attachment assembly; and
a tension element coupled to the fork lift mast and carriage attachment assembly, the tension element being repeatably moveable between locked and unlocked conditions.

2. The vehicle of claim 1, further including a bolt which couples the attachment tool and carriage attachment assembly together.

3. The vehicle of claim 2, further including a lever operatively coupled with the bolt, the lever moving the bolt between retracted and protracted positions with the carriage attachment assembly.

4. The vehicle of claim 1, further including a tool box positioned to engage the mounting beam, wherein a proximal end of the mounting beam extends between the tool box and vehicle body.

5. The vehicle of claim 1, wherein the detachable attachment mechanism extends perpendicular to the mounting beam.

6. The vehicle of claim 1, wherein the fork lift carriage is repeatably moveable between raised and lowered positions.

7. The vehicle of claim 1, further including a powered attachment tool coupled with the carriage attachment assembly.

8. The vehicle of claim 1, further including a backhoe coupled with the carriage attachment assembly.

9. The vehicle of claim 1, further including a rotary cutter coupled with the carriage attachment assembly.

10. The vehicle of claim 1, further including a hydraulic breaker coupled with the carriage attachment assembly.

11. The vehicle of claim 1, further including an angle broom coupled with the carriage attachment assembly.

12. The vehicle of claim 1, further including a cement mixer coupled with the carriage attachment assembly.

13. The vehicle of claim 1, further including a grader coupled with the carriage attachment assembly.

14. The vehicle of claim 1, further including a trencher coupled with the carriage attachment assembly.

15. The vehicle of claim 1, further including an auger coupled with the carriage attachment assembly.

16. The vehicle of claim 1, wherein the carriage attachment assembly includes a sleeve engaged with a fork of the fork lift carriage.

17. The vehicle of claim 1, wherein the tension element includes a cylinder and rod operatively coupled together.

18. The vehicle of claim 17, wherein the tension element includes a locking pin which extends through the cylinder and rod when the tension element is in the locked condition.

19. The vehicle of claim 1, wherein the carriage attachment assembly includes a plate, wherein the plate is restricted from moving relative to the fork lift mast in response to the tension element being in the locked condition.

20. A vehicle, comprising:
a truck frame;
a truck body carried by the truck frame;
a mounting beam;
a detachable attachment mechanism extending through the truck body, the detachable attachment mechanism connecting the truck frame and mounting beam together;
a fork lift mast pivotably connected directly to the mounting beam;
a tilt actuator connected directly to the mounting beam and fork lift mast;
an attachment tool coupled with the fork lift mast;
a carriage attachment assembly carried by the fork lift mast, the attachment tool being coupled with the fork lift mast through the carriage attachment assembly; and
a tension element coupled to the fork lift mast and carriage attachment assembly, the tension element being repeatably moveable between locked and unlocked conditions.

21. The vehicle of claim 20, wherein the truck body includes an opening through which the detachable attachment mechanism extends.

22. The vehicle of claim 21, wherein the detachable attachment mechanism extends through the opening and vertically to the mounting beam.

23. The vehicle of claim 20, wherein the truck body includes a truck bed through which the detachable attachment mechanism extends.

24. The vehicle of claim 23, wherein the truck bed is positioned between the truck frame and mounting beam.

25. The vehicle of claim 20, further including a tool box positioned on the mounting beam.

26. The vehicle of claim 25, wherein the tool box is positioned at an opposite end of the mounting beam from the fork lift mast.

27. The vehicle of claim 25, wherein the tool box includes a channel sized and shaped to receive the mounting beam.

28. The vehicle of claim 25, wherein the truck body includes a truck bed with upwardly extending opposed sides, the tool box extending between the opposed sides.

29. The vehicle of claim 20, wherein the tension element includes a cylinder and rod operatively coupled together.

30. The vehicle of claim 29, wherein the tension element includes a locking pin which extends through the cylinder and rod when the tension element is in the locked condition.

31. The vehicle of claim 20, wherein the carriage attachment assembly is restricted from moving relative to the fork lift mast in response to the tension element being in the locked condition.

32. The vehicle of claim 20, further including a powered attachment tool coupled with the carriage attachment assembly.

33. The vehicle of claim 20, wherein the carriage attachment assembly includes a plate, wherein the plate is restricted from moving relative to the fork lift mast in response to the tension element being in the locked condition.

34. The vehicle of claim 20, wherein the carriage attachment assembly includes a sleeve engaged with a fork of the fork lift carriage.

35. A vehicle, comprising:
a truck frame;
a truck bed carried by the truck frame;
first and second mounting beams, the truck bed extending between the truck frame and first and second mounting beams;
first and second attachment mechanisms extending through the truck bed, the first and second attachment mechanisms connecting the corresponding first and second mounting beams and truck frame together;
a fork lift mast pivotably connected to distal ends of the first and second mounting beams;

first and second tilt actuators connected between the first and second mounting beams, respectively, and the fork lift mast; and a carriage attachment assembly carried by the fork lift mast, wherein the carriage attachment assembly includes a plate;

an attachment tool coupled with the fork lift mast by the carriage attachment assembly; and a tension element coupled to the fork lift mast and plate, the tension element being repeatably moveable between locked and unlocked conditions.

36. The vehicle of claim 35, further including a fork lift carriage carried by the fork lift mast, the fork lift carriage being repeatably moveable between raised and lowered positions along the fork lift mast.

37. The vehicle of claim 35, further including a bolt which couples the attachment tool and carriage attachment assembly together.

38. The vehicle of claim 37, further including a lever operatively coupled with the bolt, the lever moving the bolt between retracted and protracted positions with the carriage attachment assembly.

39. The vehicle of claim 35, further including a tool box engaged with a proximal end of the first and second mounting beams.

40. The vehicle of claim 39, wherein the tool box includes first and second channels, the proximal ends of the first and second mounting beams extending through the first and second channels, respectively.

41. The vehicle of claim 39, wherein the tool box includes first and second channels sized and shaped to receive the first and second mounting beams, respectively.

42. The vehicle of claim 35, wherein the tension element includes a cylinder and rod operatively coupled together.

43. The vehicle of claim 42, wherein the tension element is in the locked condition in response to a locking pin extending through the cylinder and rod.

44. The vehicle of claim 35, wherein the plate is restricted from moving relative to the fork lift mast in response to the tension element being in the locked condition.

45. The vehicle of claim 35, wherein the tension element includes a cylinder and rod operatively coupled together.

46. The vehicle of claim 45, wherein the tension element includes a locking pin which extends through the cylinder and rod when the tension element is in the locked condition.

47. The vehicle of claim 35, further including a powered attachment tool coupled with the carriage attachment assembly.

* * * * *